(12) United States Patent
Kanno

(10) Patent No.: US 11,235,816 B2
(45) Date of Patent: Feb. 1, 2022

(54) DOUBLE-SKIN STRUCTURE AND METHOD OF MANUFACTURING THEREOF

(71) Applicant: MITSUBISHI HEAVY INDUSTRIES, LTD., Tokyo (JP)

(72) Inventor: Toshifumi Kanno, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 329 days.

(21) Appl. No.: 16/295,646

(22) Filed: Mar. 7, 2019

(65) Prior Publication Data

US 2019/0276092 A1    Sep. 12, 2019

(30) Foreign Application Priority Data

Mar. 12, 2018 (JP) .............................. JP2018-044438

(51) Int. Cl.
| | |
|---|---|
| *B62D 25/20* | (2006.01) |
| *B32B 7/04* | (2019.01) |
| *B32B 3/30* | (2006.01) |
| *B62D 25/04* | (2006.01) |
| *B62D 27/02* | (2006.01) |
| *B32B 15/01* | (2006.01) |

(Continued)

(52) U.S. Cl.
CPC ................ *B62D 25/20* (2013.01); *B32B 3/30* (2013.01); *B32B 7/04* (2013.01); *B32B 15/016* (2013.01); *B62D 25/02* (2013.01); *B62D 25/04* (2013.01); *B62D 27/02* (2013.01); *B62D 33/044* (2013.01); *B32B 2605/00* (2013.01); *B62D 29/008* (2013.01)

(58) Field of Classification Search
CPC ...... B62D 25/20; B62D 25/02; B62D 33/044; B62D 25/04; B62D 27/02; B62D 29/008; B62D 25/025; B62D 27/026; B32B 7/04; B32B 3/30; B32B 15/016; B32B 2605/00
USPC ........................................................ 180/312
See application file for complete search history.

(56) References Cited

U.S. PATENT DOCUMENTS

| | | | | |
|---|---|---|---|---|
| 5,297,836 | A | * | 3/1994 | Parry-Williams .... B62D 27/026 296/203.01 |
| 5,398,465 | A | * | 3/1995 | Tagg ..................... E04H 1/1216 4/449 |

(Continued)

FOREIGN PATENT DOCUMENTS

| | | |
|---|---|---|
| JP | 3358202 B2 | 12/2002 |
| JP | 2006-111187 A | 4/2006 |

(Continued)

*Primary Examiner* — Pinel E Romain
(74) *Attorney, Agent, or Firm* — Manabu Kanesaka; Benjamin Hauptman; Kenneth Berner

(57) ABSTRACT

There is provided a double-skin structure in which it is possible to obtain an aesthetic improvement in addition to restricting an increase in the number of manufacturing steps. The structure includes a connection portion connecting together an end portion of a first projection portion of a first mold member and an end portion of a second projection portion of a second mold member; a cover plate that is provided between the first mold member and the second mold member, and that blocks an upper end side of a recessed portion bounded by a first rib, a second rib, the first projection portion, and the second projection portion; and a bonding portion that bonds the cover plate to the first mold member, and the cover plate to the second mold member.

19 Claims, 14 Drawing Sheets

(51) Int. Cl.
  *B62D 33/04*  (2006.01)
  *B62D 25/02*  (2006.01)
  *B62D 29/00*  (2006.01)

(56) References Cited

U.S. PATENT DOCUMENTS

| | | | | |
|---|---|---|---|---|
| 5,741,042 | A * | 4/1998 | Livingston | B62D 29/045 |
| | | | | 220/1.5 |
| 6,224,142 | B1 * | 5/2001 | McCormack | B60P 3/04 |
| | | | | 296/186.1 |
| 8,545,965 | B2 * | 10/2013 | Buska | B29C 49/0047 |
| | | | | 428/166 |
| 2011/0206877 | A1 * | 8/2011 | Tada | B32B 7/04 |
| | | | | 428/35.8 |
| 2011/0268916 | A1 * | 11/2011 | Pardue, Jr. | B32B 5/245 |
| | | | | 428/116 |
| 2012/0068496 | A1 * | 3/2012 | Ellis | B60N 2/012 |
| | | | | 296/181.1 |
| 2013/0071625 | A1 * | 3/2013 | Masanek, Jr. | B32B 3/263 |
| | | | | 428/172 |
| 2013/0095287 | A1 * | 4/2013 | Suzuki | B29C 45/1675 |
| | | | | 428/136 |
| 2013/0185941 | A1 * | 7/2013 | Kato | B23K 28/02 |
| | | | | 29/897.2 |
| 2016/0129948 | A1 * | 5/2016 | Schnaufer | B62D 29/043 |
| | | | | 296/203.01 |
| 2016/0311382 | A1 * | 10/2016 | Murasawa | B60R 13/083 |
| 2019/0276092 | A1 * | 9/2019 | Kanno | B62D 25/04 |

FOREIGN PATENT DOCUMENTS

| | | |
|---|---|---|
| JP | 3807766 B2 | 8/2006 |
| JP | 2009-028795 A | 2/2009 |
| JP | 4326234 B2 | 9/2009 |

* cited by examiner

DOUBLE-SKIN STRUCTURE AND METHOD OF MANUFACTURING THEREOF

TECHNICAL FIELD OF THE INVENTION

The present invention relates to a double-skin structure and a method of manufacturing thereof. Priority is claimed on Japanese Patent Application No. 2018-044438, filed on Mar. 12, 2018, the content of which is incorporated herein by reference.

BACKGROUND ART

In the related art, in the view of realizing a weight reduction and improving pressure resistance in relation to streamlining and speeding up the manufacturing of transport vehicles, a double-skin structure is manufactured as a vehicle frame fabricated from a large hollow mold member made from a light alloy (for example, Japanese Patent No. 3807766). In the double-skin structure, it is necessary to join together two points on exterior and interior sides of a vehicle.

Japanese Patent No. 3807766 discloses arc welding used as a method of joining the double-skin structure.

DISCLOSURE OF THE INVENTION

If the joining of the double-skin structure is performed via only arc welding as shown in Patent Document 1, a welding distortion is large, and thus it is necessary to remove the distortion after welding. For this reason, the number of manufacturing steps for the double-skin structure increases, and the manufacturing process becomes complicated.

Because the arc welding causes a large weld deformation, there is the possibility that the aesthetic of the double-skin structure deteriorates.

An object of the present invention is to provide a double-skin structure and a method of manufacturing thereof in which it is possible to obtain an aesthetic improvement in addition to restricting an increase in the number of manufacturing steps.

Solution to the Problem

According to a first aspect of the present invention, in order to solve the problem, there is provided a double-skin structure including a first mold member which includes a first upper plate including a first upper plate end portion, a first lower plate, part of which is disposed to face a lower surface of the first upper plate, and a first rib connecting together the first upper plate and the first lower plate, and in which the first lower plate includes a first projection portion projecting from a lower end of the first rib in an extension direction of the first lower plate; a second mold member which includes a second upper plate that includes a second upper plate end portion facing the first upper plate end portion in an extension direction of the first upper plate, and that extends in the extension direction of the first upper plate, a second lower plate, part of which is disposed to face a lower surface of the second upper plate, and which extends in the extension direction of the first lower plate, and a second rib connecting together the second upper plate and the second lower plate, and in which the second lower plate includes a second projection portion projecting from a lower end of the second rib in the extension direction of the first lower plate; a connection portion connecting together an end portion of the first projection portion and an end portion of the second projection portion; a cover portion that is provided in a recessed portion bounded by the first rib, the second rib, the first projection portion, and the second projection portion, and that blocks an upper end side of the recessed portion; and a bonding portion that bonds the cover portion to the first mold member, and the cover portion to the second mold member, in which the cover portion includes a cover plate extending from the first upper plate to the second upper plate, a first side wall plate that is provided in a portion of the cover plate, which is positioned close to the first rib, and that extends from the cover plate to the first lower plate while a first gap is interposed between the first side wall plate and the first rib, and a second side wall plate that is provided in a portion of the cover plate, which is positioned close to the second rib, and that extends from the cover plate to the second lower plate while a second gap is interposed between the second side wall plate and the second rib, in which the bonding portion is provided in each of the first gap and the second gap, and bonds the first rib to the first side wall plate and the second rib to the first side wall plate, in which the cover portion includes a bottom plate that is disposed downward of the cover plate so as to face the cover plate, and that connects together a lower end of the first side wall plate and a lower end of the second side wall plate, in which a lower surface of the bottom plate is disposed to face an upper surface of the first projection portion, an upper surface of the second projection portion, and an upper surface of the connection portion, and in which the bonding portion is provided between the bottom plate and the first projection portion, the second projection portion, the connection portion.

In the present invention, because the double-skin structure has the bonding portion which bonds the cover portion to the first mold member and the second mold member, even though the end portion of the first projection portion and the end portion of the second projection portion are joined together via a welding method, it is possible to decrease a welding distortion amount of the entirety of the double-skin structure compared to when the entirety of the cover portion, the first mold member, and the second mold member is joined together via a welding method.

Therefore, a step of removing the welding distortion is not required, and thus it is possible to decrease the number of manufacturing steps for the double-skin structure.

Because it is possible to bond the cover portion to the first mold member and the second mold member without melting the cover portion, the first mold member, and the second mold member via heat, it is possible to improve the aesthetic of the double-skin structure.

Because the bonding portion is provided in each of the first gap and the second gap, the first rib and the first side wall plate are bonded together, and the second rib and the first side wall plate are bonded together, it is possible to increase the bonding area between the first mold member and the cover portion, and a bonding area between the second mold member and the cover portion. Therefore, it is possible to increase the bonding strength between the first mold member and the cover portion, and a bonding strength between the second mold member and the cover portion.

Because the bonding portion is provided in the bottom plate and the first projection portion, the second projection portion, the connection portion, it is possible to further increase the bonding area between the first mold member and the cover portion, and the bonding area between the second mold member and the cover portion. Therefore, it is possible to further increase the bonding strength between the first mold member and the cover portion, and the bonding strength between the second mold member and the cover portion.

In this configuration, the connection portion is bonded to the bottom plate via the bonding portion, and thus it is possible to reinforce the strength of the connection portion.

In the double-skin structure of the first aspect, the connection portion may be a friction stir joining portion.

The friction stir joining portion is a joining portion formed via a friction stir joining method. The friction stir joining method is a method of joining together members to be joined via frictional heat generated by rotating a tool while pressing the members to be joined against a shoulder surface of the tool.

In the friction stir joining method, because it is possible to join together the first mold member and the second mold member at a temperature lower than a melting point of each of the first mold member and the second mold member, it is possible to decrease a deformation amount after joining compared to when a welding method is used.

Because the connection portion between the end portion of the first projection portion and the end portion of the second projection portion is a friction stir joining portion, it is possible to decrease thermal effects on the double-skin structure, and to further improve the aesthetic of the double-skin structure compared to when a welding method is used.

In the double-skin structure of the first aspect, the first mold member may include a first extension portion extending from the first rib to the second rib, and disposed in the recessed portion. The second mold member may include a second extension portion that is disposed in the recessed portion while extending from the second rib to the first rib, and that faces the first extension portion in the extension direction of the first upper plate. The cover portion may be a cover plate disposed on an upper surface of the first extension portion and an upper surface of the second extension portion. The bonding portion may be provided between the cover plate and the first extension, and between the cover plate and the second extension portion.

Because the first extension portion and the second extension portion are provided to support the cover portion, the cover portion can be formed of only the cover plate. Therefore, it is possible simplify the configuration of the cover portion.

In the double-skin structure of the first aspect, the first mold member may include a first groove boundary plate that is positioned closer to the end portion of the first projection portion than the first rib, that is provided to extend upward of the first projection portion from the upper surface of the first projection portion, and that bounds a first groove which is interposed between the first rib and the first groove boundary plate and into which the first side wall plate is capable of being inserted. The second mold member may include a second groove boundary plate that is positioned closer to the end portion of the second projection portion than the second rib, that is provided to extend upward of the second projection portion from the upper surface of the second projection portion, and that bounds a second groove which is interposed between the second rib and the second groove boundary plate and into which the second side wall plate is capable of being inserted. The bonding portion may be provided between the first groove boundary plate and the first side wall plate, and between the second groove boundary plate and the second side wall plate.

In such configuration, it is possible to dispose not only the bonding portion between an external surface of the first side wall plate and the first rib and between an internal surface of the first side wall plate and the first groove boundary plate, but also the bonding portion between an external surface of the second side wall plate and the second rib and between an internal surface of the second side wall plate and the second groove boundary plate.

Therefore, it is possible to ensure a sufficient bonding strength between the first mold member and the cover portion and between the second mold member and the cover portion not only when an external force is applied to the first mold member and the second mold member in a direction where the first mold member and the second mold member approach each other, but also when an external force is applied to the first mold member and the second mold member in a direction where the first mold member and the second mold member become spaced apart from each other.

In the double-skin structure of the first aspect, at least one pair of the first rib and the first side wall plate, and the second rib and the second side wall plate may be disposed inclinedly with respect to the respective corresponding lower plates in the same direction.

In such configuration, it is possible to reduce stress concentration in an upper end portion of the bonding portion disposed between an upper end portion of the first rib and an upper end portion of the first side wall plate, and stress concentration in an upper end portion of the bonding portion disposed between an upper end portion of the second rib and an upper end portion of the second side wall plate.

Therefore, it becomes difficult for the bonding portions to peel off from the upper end portion of the first rib, the upper end portion of the first side wall plate, the upper end portion of the second rib, and the upper end portion of the second side wall plate, and thus it is possible to increase the bonding strength of each of the bonding portions.

Because it is possible to increase the bonding area between the first rib and the first side wall plate, and a bonding area between the second rib and the second side wall plate, it is possible to improve the bonding strength of each of the bonding portions.

In the double-skin structure of the first aspect, the first rib and the second rib may be provided inclinedly with respect to the first lower plate and the second lower plate, respectively, such that a width of the recessed portion increases from a bottom surface of the recessed portion to a top of the recessed portion. The cover portion may include a first side wall plate that is inclined with respect to the first lower plate while a first gap is formed between the first side wall plate and the first rib, a second side wall plate is inclined with respect to the second lower plate while a second gap is formed between the second side wall plate and the second rib, and a cover plate provided between the first side wall plate and the second side wall plate, and connecting together the first side wall plate and the second side wall plate. A position where the first side wall plate is connected to the cover plate may be lower than a position of an upper end portion of the first side wall plate, and a position where the second side wall plate is connected to the cover plate may be lower than a position of an upper end portion of the second side wall plate.

Because the first side wall plate and the second side wall plate are respectively connected to the cover plate at the positions lower than those of the upper end portion of the first side wall plate and the upper end portion of the second side wall plate, it is possible to reduce stress concentration in the upper end portion of the bonding portion disposed between the upper end portion of the first rib and the upper end portion of the first side wall plate, and stress concentration in the upper end portion of the bonding portion disposed between the upper end portion of the second rib and the upper end portion of the second side wall plate.

Therefore, it becomes difficult for the bonding portions to peel off from the upper end portion of the first rib, the upper end portion of the first side wall plate, the upper end portion of the second rib, and the upper end portion of the second side wall plate, and thus it is possible to increase the bonding strength of each of the bonding portions.

In the double-skin structure of the first aspect, the first upper plate and the first rib may be connected together at a position lower than a position of an upper end portion of the first rib, and the second upper plate and the second rib may be connected together at a position lower than a position of an upper end portion of the second rib.

Because the first rib and the first upper plate are connected together at the position lower than that of the upper end portion of the first rib, and the second rib and the second upper plate are connected together at the position lower than that of the upper end portion of the second rib, it is possible to reduce the stress concentration in the upper end portion of the bonding portion disposed between the upper end portion of the first rib and the upper end portion of the first side wall plate, and the stress concentration in the upper end portion of the bonding portion disposed between the upper end portion of the second rib and the upper end portion of the second side wall plate.

Therefore, it becomes difficult for the bonding portions to peel off from the upper end portion of the first rib, the upper end portion of the first side wall plate, the upper end portion of the second rib, and the upper end portion of the second side wall plate, and thus it is possible to increase the bonding strength of each of the bonding portions.

In the double-skin structure of the first aspect, the first mold member, the second mold member, the cover portion, and the bonding portion may form a floor of a vehicle. The structure may further include a door column including the first upper plate, the first lower plate, and the first rib; a side structure including the second upper plate, the second lower plate, and the second rib; and the cover portion. The door column and the side structure may form part of the vehicle, and be erectly disposed on the floor of the vehicle. The extension direction of the first upper plate and the extension direction of the first lower plate may be a longitudinal direction of the vehicle, and a direction of disposition of the first upper plate and the first lower plate may be a width direction of the vehicle. The first upper plate may be disposed further inward in the width direction of the vehicle from a position where the first lower plate is disposed.

Because the floor of the vehicle is configured to include the first mold member, the second mold member, the cover portion, and the bonding portion, it is possible to improve the aesthetic of the floor of the vehicle in addition to restricting an increase in the number of manufacturing steps for the floor of the vehicle.

Because part of the vehicle is configured to include the door column including the first upper plate, the first lower plate, and the first rib, and the side structure including the second upper plate, the second lower plate, and the second rib, it is possible to improve the aesthetic of the double-skin structure in addition to restricting an increase in the number of manufacturing steps for the double-skin structure.

In the double-skin structure of the first aspect, the door column may be an extruded member obtained by extruding a material in a height direction of the vehicle, and the side structure may be an extruded member obtained by extruding a material in the longitudinal direction of the vehicle.

Because an extruded member obtained by extruding a material in the height direction of the vehicle is used as the door column, and an extruded member obtained by extruding a material in the longitudinal direction of the vehicle is used as the side structure, it is possible to easily form projected parts of the door column and the side structure which are bonded to the cover portion, or it is possible to easily form the first projection portion and the second projection portion.

In the double-skin structure of the first aspect, the door column may have a third rib extending from the first rib further inward from the first upper plate in the width direction of the vehicle. The cover portion may have a cover portion body blocking the recessed portion, and a connection part that extends inward in the width direction of the vehicle from an end portion of the cover portion body, which is positioned close to the third rib, and that faces the third rib. The bonding portion may be provided between the third rib and the connection part.

Because the cover portion has the connection part facing the third rib, and the bonding portion is provided between the third rib and the connection part, it is possible to dispose the bonding portion also in a direction intersecting the longitudinal direction of the vehicle.

That is, the bonding portion is disposed between the cover portion and the door column both in the direction intersecting the longitudinal direction of the vehicle and in a direction intersecting the width direction of the vehicle. Therefore, it is possible to increase the bonding strength between the door column and the cover portion which are likely to receive a load greater than that applied to the side structure.

The double-skin structure of the first aspect may further have a first connection member that mechanically connects together the cover portion body and the second upper plate while penetrating therethrough from the cover portion body; and a second connection member that mechanically connects together the third rib and the connection part while penetrating therethrough from the connection part.

Because the double-skin structure has the first connection member that mechanically connects together the cover portion body and the second upper plate while penetrating therethrough from the cover portion body, and the second connection member that mechanically connects together the third rib and the connection part while penetrating therethrough from the connection part, it is possible to increase a connection strength between the cover portion and the door column, and a connection strength between the cover portion and the side structure.

In the double-skin structure of the first aspect, the door column may have a third rib extending inward from the first upper plate in the width direction of the vehicle. The third rib may form an end portion accommodating portion which is interposed between the third rib and the first upper plate, and into which an end portion of the cover portion is inserted. In a state where the end portion of the cover portion is inserted into the end portion accommodating portion, the bonding portion may be provided between the first upper plate and a surface of the end portion of the cover portion which is positioned outward in the width direction of the vehicle, and between the third rib and a surface of the end portion of the cover portion which is positioned inward in the width direction of the vehicle.

Because the end portion accommodating portion, into which the end portion of the cover portion is inserted, is formed between the third rib and the first upper plate, it is possible to regulate the position of the end portion of the cover portion.

Because the bonding portion is provided between the first upper plate and the surface of the end portion of the cover portion which is positioned outward in the width direction of the vehicle, and the bonding portion is provided between a fourth rib and the surface of the end portion of the cover portion which is positioned inward in the width direction of the vehicle, it is possible to increase the bonding strength between the door column and the end portion of the cover portion which are likely to receive a load greater than that applied to the side structure.

The double-skin structure of the first aspect may further include a door column including the first upper plate, the first lower plate, and the first rib; a side structure including the second upper plate, the second lower plate, and the second rib; and the cover portion. The door column and the side structure may form part of the vehicle, and be erectly disposed on the floor of the vehicle. The extension direction of the first upper plate and the extension direction of the first lower plate may be the longitudinal direction of the vehicle. The direction of disposition of the first upper plate and the first lower plate may be the width direction of the vehicle. The cover portion may include a cover plate extending from the first upper plate to the second upper plate, a first side wall plate that is provided in an end portion of the cover plate, which is positioned close to the first rib, and that extends from the cover plate to the first lower plate while a first gap is interposed between the first side wall plate and the first rib, a second side wall plate that is provided in an end portion of the cover plate, which is positioned close to the second rib, and that extends from the cover plate to the second lower plate while a second gap is interposed between the second side wall plate and the second rib, and a bottom plate that is disposed close to the first projection portion and the second projection portion of the first and second mold members so as to face the cover plate, and that connects together an end of the first side wall plate and an end of the second side wall plate. The bottom plate may be disposed to face the first projection portion, the second projection portion, and the connection portion while a third gap is interposed between the bottom plate and the first projection portion, the second projection portion, the connection portion. The bonding portion may be disposed in such a manner that each of the first gap, the second gap, and the third gap is filled with the bonding portion.

The double-skin structure has the cover portion including the cover plate, the first side wall plate, the second side wall plate, and the bottom plate, the bonding portion is disposed such that the first gap formed between the first rib and the first side wall plate is filled with the bonding portion, the bonding portion is disposed such that the second gap formed between the second rib and the second side wall plate is filled with the bonding portion, and the bonding portion is disposed such that the third gap formed between the bottom plate and the first projection portion, the second projection portion, the connection portion is filled with the bonding portion. Therefore, it is possible to increase the bonding strength between the cover portion having a tubular shape and the door column, the side structure.

In the double-skin structure of the first aspect, the first rib and the second rib may be provided inclinedly with respect to the first lower plate and the second lower plate, respectively, such that a width of the recessed portion increases from the connection portion to the first upper plate and the second upper plate. The first side wall plate may be inclined in the same direction as an inclination direction of the first rib while the first gap is formed between the first side wall plate and the first rib. The second side wall plate may be inclined in the same direction as an inclination direction of the second rib while the second gap is formed between the second side wall plate and the second rib.

Because the first rib and the first side wall plate are inclined in the same direction such that the width of the recessed portion increases from the connection portion to the first upper plate and the second upper plate, and the second rib and the second side wall plate are inclined in the same direction, it is possible to reduce stress concentration in a peeling direction applied to a bonding part between the first upper plate and the cover portion, and a bonding part between the second upper plate and the cover portion.

Because a bonding surface inclined with respect to a load application direction is provided, a load can be transmitted as a shear force, and thus it is possible to increase the bonding strength.

According to a second aspect, there is provided a double-skin structure that forms part of a vehicle, and includes a door column and a side structure which are erectly disposed on a floor of the vehicle, the structure including a bonding portion bonding together the door column and the side structure which are disposed to face each other in a longitudinal direction of the vehicle, in which the door column includes a first side plate, a second side plate disposed inward from the first side plate, and facing the first side plate in a width direction of the vehicle, a first rib which extends in the width direction of the vehicle and connects together the first side plate and the second side plate, and from which a first projection portion of the first side plate projects to the side structure, and a second projection portion that projects to the side structure from a portion of the first rib which is positioned opposite to one side of the first rib, to which the second side plate is connected, and that forms an insertion groove which is interposed between the second projection portion and the first projection portion and into which an end portion of the side structure is inserted, in which the side structure includes a third side plate extending to the insertion groove, and facing the first projection portion in the width direction of the vehicle, a fourth side plate extending to the insertion groove, and facing the second projection portion in the width direction of the vehicle, and a second rib connecting together the third side plate and the fourth side plate, and in which the bonding portion is provided between the first projection portion and the third side plate, and between the fourth side plate and the second projection portion.

The insertion groove, into which the end portion of the side structure is inserted, is formed between the first projection portion and the second projection portion, the end portion of the side structure is disposed in the insertion groove, the bonding portion is provided between the third side plate and the first projection portion, and the bonding portion is provided between the fourth side plate and the second projection portion. Therefore, it is possible to bond together the door column and the side structure without using a technique such as the friction stir joining method or a welding method.

As a result, it is possible to improve the aesthetic of the double-skin structure in addition to restricting an increase in the number of manufacturing steps.

The double-skin structure of the second aspect may further have a first connection member that mechanically connects together the third side plate and the first projection portion while penetrating therethrough from the first projection portion; and a second connection member that mechanically connects together the fourth side plate and the second projection portion while penetrating therethrough from the second projection portion.

Because the double-skin structure has the first connection member that mechanically connects together the third side plate and the first projection portion while penetrating therethrough from the first projection portion, and the second connection member that mechanically connects together the fourth side plate and the second projection portion while penetrating therethrough from the second projection portion, it is possible to increase a connection strength between the door column and the side structure.

In the double-skin structure of the second aspect, the first projection portion may include a first protrusion portion projecting to the second projection portion. The second projection portion may include a second protrusion portion projecting to the first projection portion. The third side plate may be provided with a first recessed portion that accommodates part of the first protrusion portion while the bonding portion is interposed between part of the first protrusion portion and the first recessed portion. The fourth side plate may be provided with a second recessed portion that accommodates part of the second protrusion portion while the bonding portion is interposed between part of the second protrusion portion and the second recessed portion.

Because the double-skin structure has the first projection portion with the first protrusion portion projecting to the second projection portion; the second projection portion with the second protrusion portion projecting to the first projection portion; the third side plate with the first recessed portion that accommodate part of the first protrusion portion while the bonding portion is interposed between the first recessed portion and part of the first protrusion portion; and the fourth side plate with the second recessed portion that accommodates part of the second protrusion portion while the bonding portion is interposed between the second recessed portion and part of the second protrusion portion, the side structure can be slidably fitted into the insertion groove, and it is possible to improve the bonding strength between the door column and the side structure.

In the double-skin structure of the second aspect, the door column may be an extruded member obtained by extruding a material in a height direction of the vehicle, and the side structure may be an extruded member obtained by extruding a material in the longitudinal direction of the vehicle.

Because an extruded member obtained by extruding a material in the height direction of the vehicle is used as the door column, it is possible to easily form the projection portions.

According to a third aspect, there is provided a double-skin structure that forms part of a vehicle, and includes a door column and a side structure which are erectly disposed on a floor of the vehicle, the structure including a bonding portion bonding together the door column and the side structure which are disposed to face each other in a longitudinal direction of the vehicle; and a bonding member having an L shape, in which the door column includes a first side plate, a second side plate disposed inward from the first side plate, and facing the first side plate in a width direction of the vehicle, and a first rib which extends in the width direction of the vehicle and connects together the first side plate and the second side plate, and from which a first projection portion of the first side plate projects to the side structure, in which the side structure includes a third side plate facing the first projection portion in the width direction of the vehicle, a fourth side plate that is disposed inward from the third side plate, faces the third side plate in the width direction of the vehicle, and is in contact with the first rib in the longitudinal direction of the vehicle, and a second rib connecting together the third side plate and the fourth side plate, in which the bonding member is disposed to face a corner portion formed by the fourth side plate and the first rib, and in which the bonding portion is provided between the bonding member and the fourth side plate, the first rib, and between the third side plate and the first projection portion.

Because the bonding member is provided to face the corner portion formed by the fourth side plate and the first rib, and the bonding portion is disposed between the bonding member and the fourth side plate, the first rib, and between the third side plate and the first projection portion, it is possible to easily bond together the door column and the side structure compared to when bonding is performed after inserting the end portion of the side structure into the insertion groove formed in the door column.

In the present invention, it is possible to improve the aesthetic of the double-skin structure in addition to restricting an increase in the number of manufacturing steps for the double-skin structure.

EMBODIMENTS OF THE INVENTION

Hereinbelow, embodiments of the present invention will be described in detail with reference to the drawings.

First Embodiment

Figure 1:
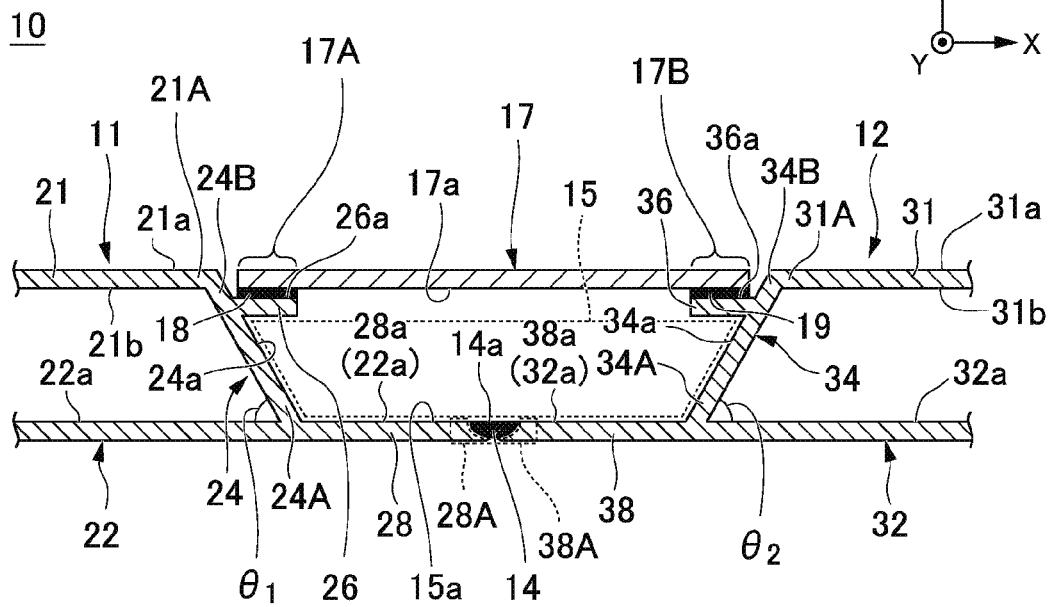
FIG. 1 is a cross-sectional view showing a schematic configuration of a double-skin structure according to a first embodiment of the present invention.
Figure 2:
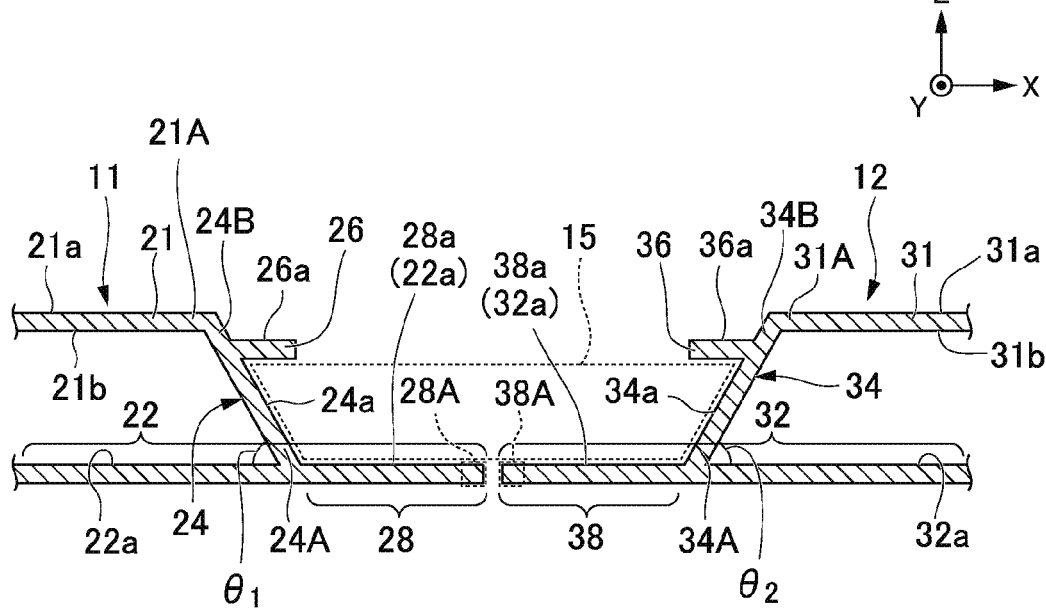
FIG. 2 is a cross-sectional view showing a first mold member and a second mold member of the double-skin structure according to the first embodiment of the present invention.

A double-skin structure 10 of a first embodiment will be described with reference to FIGS. 1 and 2. In FIGS. 1 and 2, an X direction denotes an arrangement direction (in other words, a width direction of a cover plate 17) of a first mold member 11 and a second mold member 12, a Y direction denotes a longitudinal direction of the cover plate 17 which is perpendicular to the X direction, and a Z direction denotes a vertical direction perpendicular to the X direction and the Y direction. FIG. 2 schematically shows a state where the first mold member 11 and the second mold member 12 are not connected together.

The double-skin structure 10 of the first embodiment has the first mold member 11; the second mold member 12; a connection portion 14; a recessed portion 15; the cover plate 17 which is a cover portion; and bonding portions 18 and 19.

The first mold member 11 and the second mold member 12 are disposed in the X direction such that the recessed portion 15 is bounded between the first mold member 11 and the second mold member 12.

The first mold member 11 has a first upper plate 21; a first lower plate 22; a first rib 24; and a first extension portion 26. The first upper plate 21 is a planar material parallel with an XY plane (imaginary plane passing through the X direction and the Y direction). The first upper plate 21 has an upper surface 21a and a lower surface 21b which are parallel with the XY plane, and a first upper plate end portion 21A which is disposed in the X direction and is connected with the first rib 24.

The first lower plate 22 is a planar material parallel with the XY plane. The first lower plate 22 has an upper surface 22a parallel with the XY plane. The first lower plate 22 is disposed such that part of the upper surface 22a faces the lower surface 21b of the first upper plate 21 and the first lower plate 22 is spaced apart downward from the first upper plate 21.

A lower end 24A of the first rib 24 is connected with the upper surface 22a of the first lower plate 22. The first lower plate 22 has a first projection portion 28 that projects from the lower end 24A of the first rib 24 in the X direction (extension direction of the first lower plate 22). The first projection portion 28 includes an end portion 28A connected with the second mold member 12 (specifically, an end portion 38A of a second projection portion 38 which will be described later).

The first projection portion 28 has an upper surface 28a that forms part of the upper surface 22a of the first lower plate 22. The upper surface 28a of the first projection portion 28 faces part of a lower surface 17a of the cover plate 17.

The first rib 24 is a planar material, and has the lower end 24A and an upper end 24B. The lower end 24A of the first rib 24 is connected with the first lower plate 22. The upper end 24B of the first rib 24 is connected with the first upper plate end portion 21A of the first upper plate 21.

The first rib 24 is disposed inclinedly with respect to the upper surface 22a of the first lower plate 22 such that an angle $\theta_1$ of the first rib 24 with respect to the upper surface 22a of the first lower plate 22 is less than 90°.

The first extension portion 26 is provided on part of an upper portion of the first rib 24, and is positioned downward of the upper end 24B of the first rib 24. The first extension portion 26 is provided on an external surface 24a of the first rib 24, and is disposed in the recessed portion 15.

The first extension portion 26 extends from the external surface 24a of the first rib 24 in an XY-plane direction. The first extension portion 26 has an upper surface 26a on which the bonding portion 18 is provided.

The first mold member 11 may be formed by integrating the first upper plate 21, the first lower plate 22, the first rib 24, and the first extension portion 26. The first upper plate 21, the first lower plate 22, the first rib 24, and the first extension portion 26 may have the same thickness.

The second mold member 12 has a second upper plate 31; a second lower plate 32; a second rib 34; and a second extension portion 36. The second upper plate 31 is a planar material parallel with the XY plane. The second upper plate 31 has an upper surface 31a and a lower surface 31b which are parallel with the XY plane, and a second upper plate end portion 31A which is disposed in the X direction and is connected with the second rib 34.

The second lower plate 32 is a planar material parallel with the XY plane. The second lower plate 32 has an upper surface 32a parallel with the XY plane. The second lower plate 32 is disposed such that part of the upper surface 32a faces the lower surface 31b of the second upper plate 31 and the second lower plate 32 is spaced apart downward from the second upper plate 31.

A lower end 34A of the second rib 34 is connected with the upper surface 32a of the second lower plate 32. The second lower plate 32 has the second projection portion 38 that projects from the lower end 34A of the second rib 34 in the X direction (extension direction of the first lower plate). The second projection portion 38 includes the end portion 38A connected with the end portion 28A of the first projection portion 28.

The second projection portion 38 has an upper surface 38a that forms part of the upper surface 32a of the second lower plate 32. The upper surface 38a of the second projection portion 38 faces part of the lower surface 17a of the cover plate 17.

The second rib 34 is a planar material, and has the lower end 34A and an upper end 34B. The lower end 34A of the second rib 34 is connected with the second lower plate 32. The upper end 34B of the second rib 34 is connected with the second upper plate end portion 31A of the second upper plate 31.

The second rib 34 is disposed inclinedly with respect to the upper surface 32a of the second lower plate 32 such that an angle $\theta_2$ of the second rib 34 with respect to the upper surface 32a of the second lower plate 32 is less than 90°.

The second extension portion 36 is provided on part of an upper portion of the second rib 34, and is positioned downward of the upper end 34B of the second rib 34. The second extension portion 36 is provided on an external surface 34a of the second rib 34, and is disposed in the recessed portion 15.

The second extension portion 36 extends from the external surface 34a of the second rib 34 in the XY-plane direction. The second extension portion 36 has an upper surface 36a on which the bonding portion 19 is provided.

The second mold member 12 may be formed by integrating the second upper plate 31, the second lower plate 32, the second rib 34, and the second extension portion 36. The second upper plate 31, the second lower plate 32, the second rib 34, and the second extension portion 36 may have the same thickness.

A metallic material (for example, aluminum) can be used as the material of each of the first mold member 11 and the second mold member 12.

The connection portion 14 is provided between the end portion 28A of the first projection portion 28 and the end portion 38A of the second projection portion 38. The connection portion 14 extends in the Y direction. The connection portion 14 connects together the end portion 28A of the first projection portion 28 and the end portion 38A of the second projection portion 38.

The connection portion 14 can be one of a weld portion that is formed via any one of a welding method (for example, arc welding method), a friction stir joining portion, and a solidified (cured) adhesive.

The weld portion is formed by making molten metal via melting a welding rod, part of the end portion 28A of the first projection portion 28, and part of the end portion 38A of the second projection portion 38 (or by melting part of the end portion 28A of the first projection portion 28 and part of the end portion 38A of the second projection portion 38), and allowing the molten metal to coagulate.

The friction stir joining portion is a joining portion formed via a friction stir joining method. The friction stir joining method is a method of joining together the end portions 28A and 38A via frictional heat generated by rotating a tool while pressing the end portions 28A and 38A against a shoulder surface of the tool.

In the friction stir joining method, because it is possible to join together the first mold member 11 and the second mold member 12 at a temperature lower than a melting point of each of the first mold member 11 and the second mold member 12, it is possible to decrease a deformation amount after joining compared to when a welding method is used.

Because a friction stir joining portion is used as the connection portion 14 between the end portion 28A of the first projection portion 28 and the end portion 38A of the second projection portion 38, it is possible to decrease thermal effects on the double-skin structure 10, and to further improve the aesthetic of the double-skin structure 10 compared to when a welding method is used.

The adhesive is not limited to a specific type of adhesive insofar as the adhesive can bond the end portion 28A of the first projection portion 28 to the end portion 38A of the second projection portion 38. A two-component room-temperature epoxy adhesive is preferably used.

If the two-component room-temperature curing epoxy adhesive is used as an adhesive, because it is not necessary to heat the first mold member 11 and the second mold member 12 when bonding together the end portion 28A of the first projection portion 28 and the end portion 38A of the second projection portion 38, it is possible to restrict the first mold member 11 and the second mold member 12 from being damaged due to heat generated when the adhesive is cured.

The recessed portion 15 is provided between the first mold member 11 and the second mold member 12. The recessed portion 15 is disposed between the first extension portion 26, the second extension portion 36 and the first projection portion 28, the second projection portion 38 in the Z direction.

The recessed portion 15 is bounded by the connection portion 14, the first rib 24, the second rib 34, the first projection portion 28, and the second projection portion 38. A bottom surface 15a of the recessed portion 15 is formed of an upper surface 14a of the connection portion 14, the upper surface 28a of the first projection portion 28, and the upper surface 38a of the second projection portion 38.

The recessed portion 15 has a shape in which the width of the recessed portion 15 in the X direction increases from the bottom surface 15a to the top of the recessed portion 15. The recessed portion 15 extends in the Y direction.

An upper end of the recessed portion 15 is an open end when the cover plate 17 is not disposed on the first mold member 11 and the second mold member 12.

The cover plate 17 is a planar material having the X direction as a width direction and the Y direction as a longitudinal direction. The cover plate 17 has a first end portion 17A and a second end portion 17B which are disposed in the X direction. The first end portion 17A faces the upper surface 26a of the first extension portion 26, and extends in the Y direction. The second end portion 17B faces the upper surface 36a of the second extension portion 36, and extends in the Y direction.

The cover plate 17 is bonded to the upper surface 26a of the first extension portion 26 via the bonding portion 18, and the upper surface 36a of the second extension portion 36 via the bonding portion 19. Therefore, the cover plate 17 blocks an upper end side (which is an open end) of the recessed portion 15.

The same material as that of the first mold member 11 and the second mold member 12 can be used as the material of the cover plate 17.

The thickness of the cover plate 17 may be less than that of the planar material of each of the first mold member 11 and the second mold member 12. If the thickness of the cover plate 17 is set to be less than that of the planar material of each of the first mold member 11 and the second mold member 12, it is possible to restrict the cover plate 17 from peeling off from the bonding portions 18 and 19.

The bonding portion 18 is provided between the upper surface 26a of the first extension portion 26 and the first end portion 17A of the cover plate 17. The bonding portion 18 bonds together the first extension portion 26 and the cover plate 17.

The bonding portion 19 is provided between the upper surface 36a of the second extension portion 36 and the second end portion 17B of the cover plate 17. The bonding portion 19 bonds together the second extension portion 36 and the cover plate 17.

The bonding portions 18 and 19 are not limited to a specific type of bonding portion insofar as the bonding portion can bond the first extension portion 26 and the second extension portion 36 to the cover plate 17. A two-component room-temperature epoxy adhesive is preferably used.

If the two-component room-temperature curing epoxy adhesive is used as the bonding portions 18 and 19, because it is not necessary to heat the first extension portion 26, the second extension portion 36, and the cover plate 17 when bonding the first extension portion 26 and the second extension portion 36 to the cover plate 17, it is possible to restrict the first extension portion 26, the second extension portion 36, and the cover plate 17 from being damaged due to heat.

A thermosetting epoxy adhesive may be used as the bonding portions 18 and 19. In also this case, it is possible to improve the aesthetic of the double-skin structure 10.

Because the double-skin structure 10 of the first embodiment has the bonding portions 18 and 19 which bond the cover plate 17 which is a cover portion to the first mold member 11 and the second mold member 12, even though the end portion 28A of the first projection portion 28 and the end portion 38A of the second projection portion 38 are joined together via a welding method, it is possible to decrease a welding distortion amount of the entirety of the double-skin structure 10 compared to when the entirety of the cover plate 17, the first mold member 11, and the second mold member 12 is joined together via a welding method. Therefore, a step of removing the welding distortion is not required, and thus it is possible to decrease the number of manufacturing steps for the double-skin structure 10.

Because it is possible to bond the cover plate 17 to the first mold member 11 and the second mold member 12 without melting the cover plate 17, the first mold member 11, and the second mold member 12 via heat, it is possible to improve the aesthetic of the double-skin structure.

Because the first extension portion 26 and the second extension portion 36 are provided, the cover portion can be formed of only the cover plate 17. Therefore, it is possible to simplify the configuration of the cover portion.

In one example described in the first embodiment, the angles $\theta_1$ and $\theta_2$ are less than 90° (in other words, the first rib 24 and the second rib 34 are provided inclinedly with respect to the upper surface 22a of the first lower plate 22 and the upper surface 32a of the second lower plate 32, respectively); however, the angles $\theta_1$ and $\theta_2$ may be set to 90°.

Subsequently, a method of manufacturing the double-skin structure 10 of the first embodiment will be described with reference to FIGS. 1 to 3.

Figure 3:
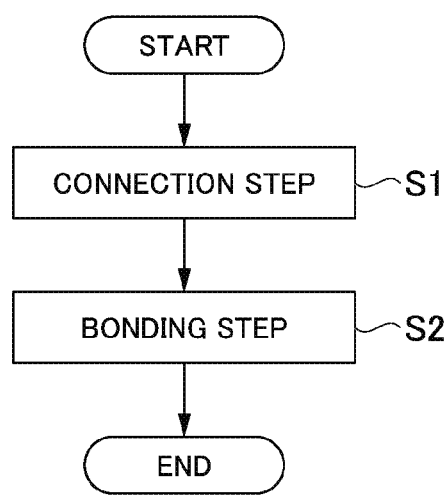
FIG. 3 is a flowchart showing a method of manufacturing the double-skin structure according to the first embodiment of the present invention.

If a process shown in FIG. 3 starts, the end portion 28A of the first projection portion 28 and the end portion 38A of the second projection portion 38 are connected together in S1 (connection step).

In the connection step, the end portion 28A of the first projection portion 28 and the end portion 38A of the second projection portion 38 are connected (joined or bonded) together via one method of a welding method (for example, arc welding), a friction stir joining method, and a bonding method.

If the welding method is used, the end portion 28A of the first projection portion 28 and the end portion 38A of the second projection portion 38, which are base materials, are melted and solidified, and thus the end portion 28A of the first projection portion 28 and the end portion 38A of the second projection portion 38 are joined together.

A filler wire may be used in this case, and the end portion 28A of the first projection portion 28 and the end portion 38A of the second projection portion 38 may be joined together by melting the filler wire. Therefore, a welding bead (weld portion) is formed as the connection portion 14.

If the friction stir joining method is used, the end portion 28A of the first projection portion 28 and the end portion 38A of the second projection portion 38 are joined together by rotating a tool while pressing the boundary between the upper surface 28a of the end portion 28A and the upper surface 38a of the end portion 38A against a shoulder surface of the tool, and forming a friction stir joining portion, which becomes the connection portion 14, via frictional heat generated at that time.

If the end portion 28A of the first projection portion 28 and the end portion 38A of the second projection portion 38 are joined together via the friction stir joining method, it is possible to improve the aesthetic of the double-skin structure 10 compared to when the end portion 28A of the first projection portion 28 and the end portion 38A of the second projection portion 38 are joined together via the welding method.

Because the connection step is performed before a bonding step in which the cover plate 17 is bonded to the first mold member 11 and the second mold member 12, if the friction stir joining method is used, a bobbin type tool may be used.

If the bonding method is used, the end portion 28A of the first projection portion 28 and the end portion 38A of the second projection portion 38 are bonded together via an adhesive. The adhesive is not limited to a specific type of adhesive insofar as the adhesive can bond the end portion 28A of the first projection portion 28 to the end portion 38A of the second projection portion 38.

A two-component room-temperature curing epoxy adhesive is preferably used as an adhesive.

If the two-component room-temperature curing epoxy adhesive is used as an adhesive, because it is not necessary to heat the first mold member 11 and the second mold member 12 when bonding together the end portion 28A of the first projection portion 28 and the end portion 38A of the second projection portion 38, it is possible to restrict the first mold member 11 and the second mold member 12 from being damaged due to heat in the bonding step.

A thermosetting epoxy adhesive may be used as an adhesive.

In succession, in S2, the cover plate 17 (cover portion) blocking the upper end side of the recessed portion 15 is bonded to the first mold member 11 and the second mold member 12 via the respective bonding portions 18 and 19 (bonding step).

Specifically, the cover plate 17 is bonded to the first mold member 11 and the second mold member 12 by forming the bonding portion 18 between the first end portion 17A of the cover plate 17 and the upper surface 26a of the first extension portion 26, and forming the bonding portion 19 between the second end portion 17B of the cover plate 17 and the upper surface 36a of the second extension portion 36.

As a result, the double-skin structure 10 of the first embodiment is manufactured as shown in FIG. 1.

Because the method of manufacturing the double-skin structure 10 of the first embodiment includes the bonding step in which the cover plate 17 (cover portion) is bonded to the first mold member 11 and the second mold member 12 via the respective bonding portions 18 and 19, even though the end portion 28A of the first projection portion 28 and the end portion 38A of the second projection portion 38 are joined together via a welding method, it is possible to decrease a welding distortion amount of the entirety of the double-skin structure 10 compared to when the entirety of the cover plate 17, the first mold member 11, and the second mold member 12 is joined together via the welding method. Therefore, a step of removing the welding distortion is not required, and thus it is possible to decrease the number of manufacturing steps for the double-skin structure 10.

Because it is possible to bond the cover plate 17 to the first mold member 11 and the second mold member 12 without melting the cover plate 17, the first mold member 11, and the second mold member 12 via heat, it is possible to improve the aesthetic of the double-skin structure 10.

Because the bonding step is performed after the connection step, even though a heating process is performed in the connection step, heat generated in the connection step can be restricted from adversely affecting the bonding step.

Because the bonding step is performed after the connection step, a distortion generated in the connection step can be easily fixed after the connection step and before the bonding step.

Second Embodiment

Figure 4:
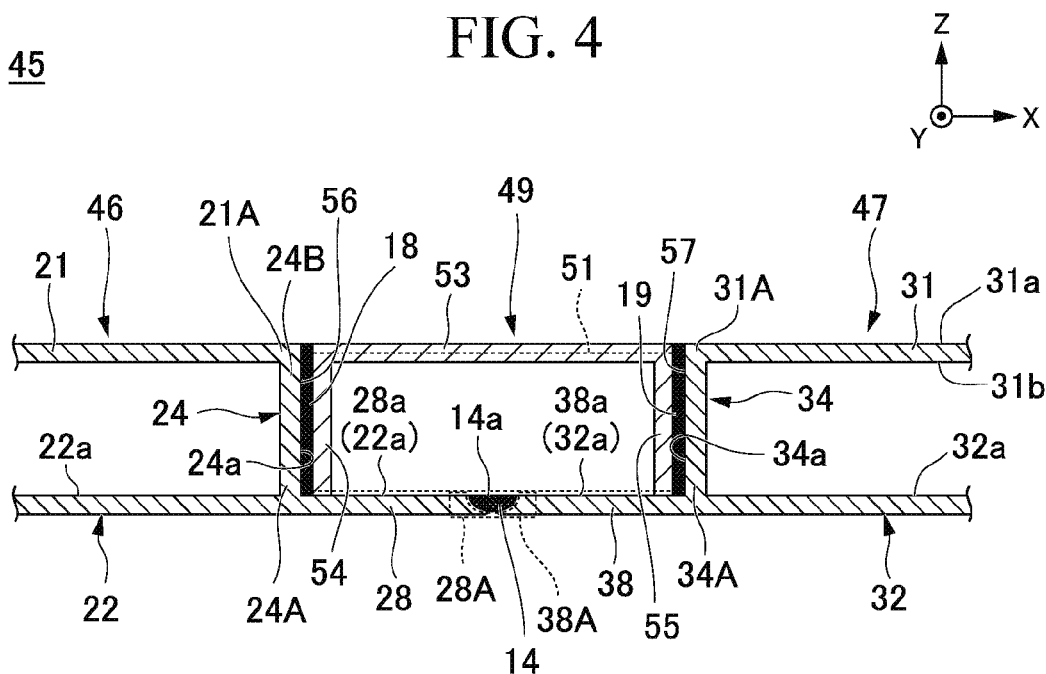
FIG. 4 is a cross-sectional view showing a schematic configuration of a double-skin structure according to a second embodiment of the present invention.

A double-skin structure 45 of a second embodiment will be described with reference to FIG. 4. In FIG. 4, the same reference symbols will be assigned to the same configuration elements as those of the structure shown in FIGS. 1 and 2.

The double-skin structure 45 has a first mold member 46; a second mold member 47; the connection portion 14; a recessed portion 51; a cover portion 49; and the bonding portions 18 and 19.

The first mold member 46 has the same configuration as that of the first mold member 11 except that the first extension portion 26 is removed from the configuration elements of the first mold member 11 described in the first embodiment, and the first rib 24 is disposed perpendicular to the first upper plate 21 and the first lower plate 22.

The second mold member 47 has the same configuration as that of the second mold member 12 except that the second extension portion 36 is removed from the configuration elements of the second mold member 12 described in the first embodiment, and the second rib 34 is disposed perpendicular to the second upper plate 31 and the second lower plate 32.

The recessed portion 51 is provided between the first mold member 46 and the second mold member 47. The recessed portion 51 is a square tube-shaped groove bounded by the external surface 24a of the first rib 24, the external surface 34a of the second rib 34, the upper surface 14a of the connection portion 14, the upper surface 28a of the first projection portion 28, and the upper surface 38a of the second projection portion 38. The recessed portion 51 extends in the Y direction. The cover portion 49 is provided in the recessed portion 51, and blocks an upper end side of the recessed portion 51. The width of the recessed portion 51 in the X direction is less than the width of the cover portion 49 in the X direction.

The cover portion 49 has a cover plate 53; a first side wall plate 54; and a second side wall plate 55. The cover plate 53 is a planar material that extends in a direction (X direction) from the first upper plate 21 to the second upper plate 31.

The first side wall plate 54 is provided in an end portion (positioned close to the first mold member 46) of the cover plate 53. The first side wall plate 54 extends from the cover plate 53 to the first lower plate 22 in the Z direction while a first gap 56 is interposed between the first side wall plate 54 and the first rib 24.

The second side wall plate 55 is provided in an end portion (positioned close to the second mold member 47) of the cover plate 53. The second side wall plate 55 extends from the cover plate 53 to the second lower plate 32 in the Z direction while a second gap 57 is interposed between the second side wall plate 55 and the second rib 34.

The bonding portion 18 is provided in such a manner that the first gap 56 is filled with the bonding portion 18. The bonding portion 18 bonds together the first rib 24 and the first side wall plate 54.

The bonding portion 19 is provided in such a manner that the second gap 57 is filled with the bonding portion 19. The bonding portion 19 bonds together the second rib 34 and the second side wall plate 55.

In the double-skin structure 45 of the second embodiment, because the bonding portion 18 is provided in the first gap 56, the bonding portion 19 is provided in the second gap 57, the first rib 24 and the first side wall plate 54 are bonded together, and the second rib 34 and the second side wall plate 55 are bonded together, it is possible to increase the bonding area between the first mold member 46 and the cover portion 49, and a bonding area between the second mold member 47 and the cover portion 49. Therefore, it is possible to increase the bonding strength between the first mold member 46 and the cover portion 49, and a bonding strength between the second mold member 47 and the cover portion 49.

Figure 5:
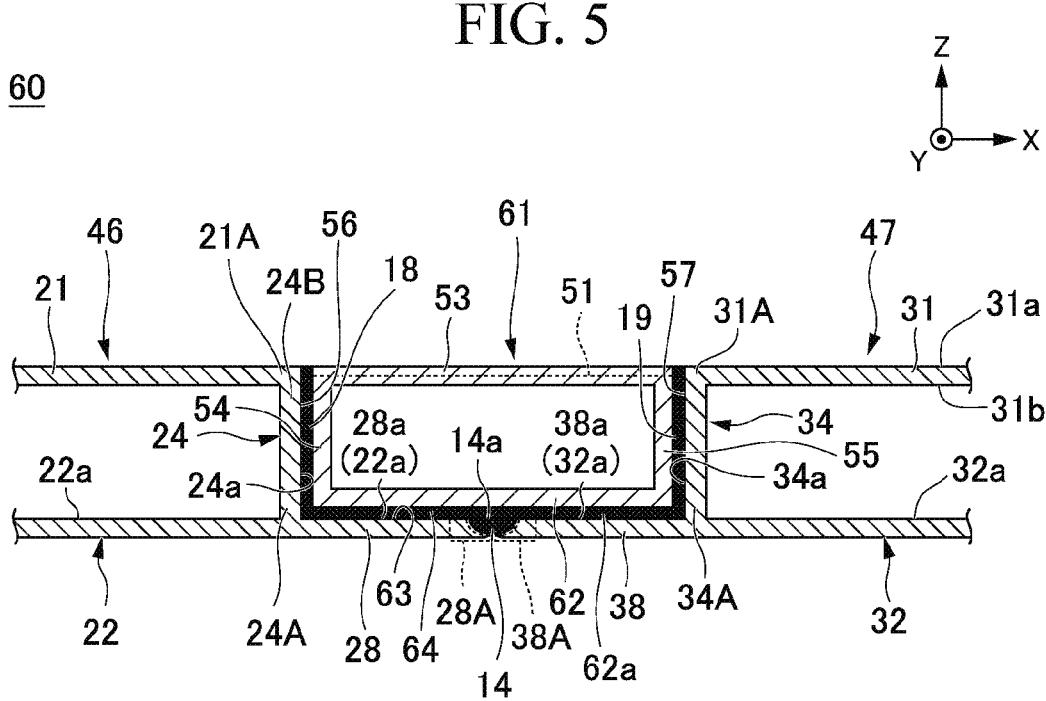
FIG. 5 is a cross-sectional view showing a schematic configuration of a double-skin structure according to a first modification example of the second embodiment of the present invention.

Subsequently, a double-skin structure 60 of a first modification example of the second embodiment will be described with reference to FIG. 5. In FIG. 5, the same reference symbols will be assigned to the same configuration elements as those of the structure shown in FIG. 4.

The double-skin structure 60 has the same configuration as that of the double-skin structure 45 except that a cover portion 61 is provided instead of the cover portion 49 of the double-skin structure 45 of the second embodiment, and a bonding portion 64 is provided.

The cover portion 61 has the same configuration as that of the cover portion 49 described in the second embodiment except that the cover portion 61 has a bottom plate 62 which connects a lower end of the first side wall plate 54 to a lower end of the second side wall plate 55. The cover portion 61 has a rectangular tube shape.

A lower surface 62a of the bottom plate 62 faces the upper surface 14a of the connection portion 14, the upper surface 28a of the first projection portion 28, and the upper surface 38a of the second projection portion 38.

A third gap 63 is formed between the lower surface 62a of the bottom plate 62 and the upper surface 14a of the connection portion 14, the upper surface 28a of the first projection portion 28, the upper surface 38a of the second projection portion 38.

The bonding portion 64 is disposed in such a manner that the third gap 63 is filled with the bonding portion 64. The bonding portion 64 bonds the lower surface 62a of the bottom plate 62 to the upper surface 14a of the connection portion 14, the upper surface 28a of the first projection portion 28, and the upper surface 38a of the second projection portion 38.

Because the double-skin structure 60 of the first modification example of the second embodiment has the bonding portion 64 that bonds the bottom plate 62 to the connection portion 14, the first projection portion 28, and the second projection portion 38, it is possible to increase the bonding area between the first mold member 46 and the cover portion 49, and a bonding area between the second mold member 47 and the cover portion 49. Therefore, it is possible to further increase a bonding strength between the first mold member 46 and the cover portion 49, and a bonding strength between the second mold member 47 and the cover portion 49.

Because the bottom plate 62 is provided on the upper surface 14a of the connection portion 14 via the bonding portion 64, it is possible to reinforce the strength of the connection portion 14.

Figure 6:
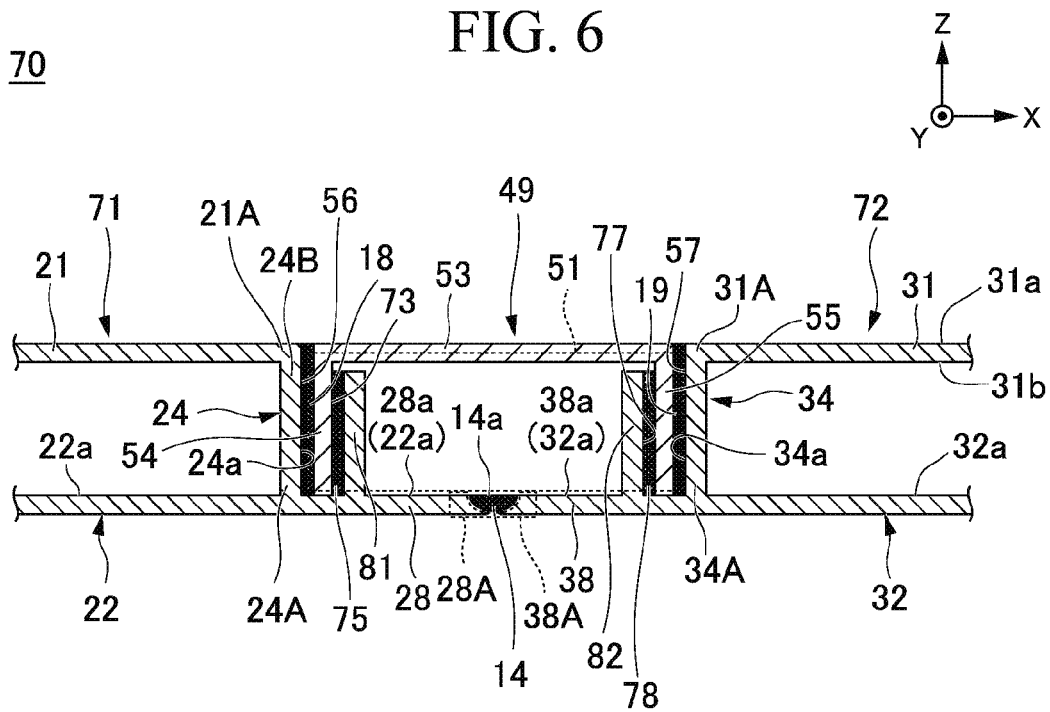
FIG. 6 is a cross-sectional view showing a schematic configuration of a double-skin structure according to a second modification example of the second embodiment of the present invention.
Figure 7:
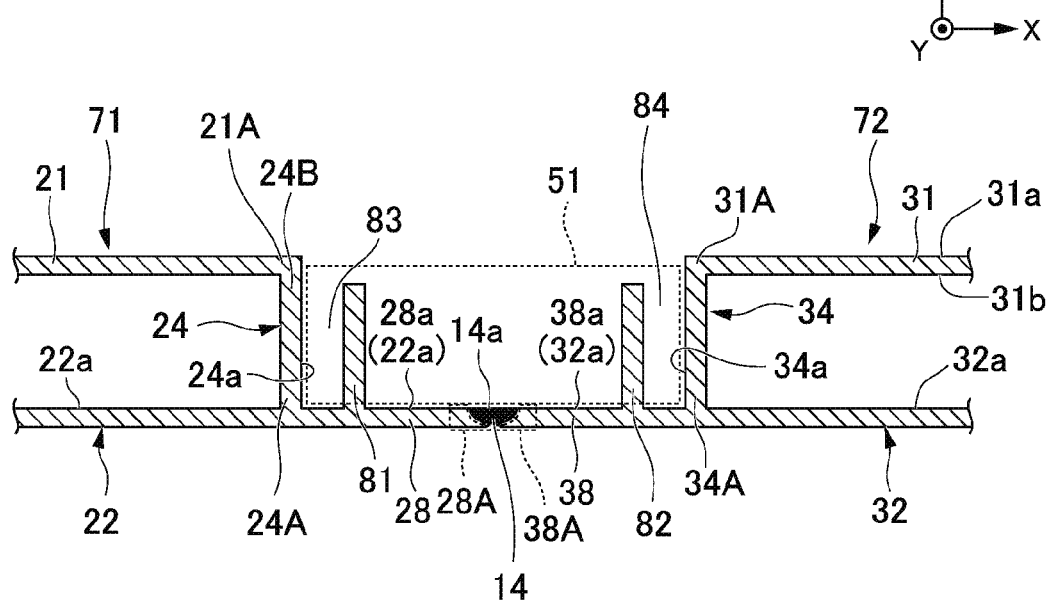
FIG. 7 is a cross-sectional view of a first mold member and a second mold member of the double-skin structure according to the second modification example of the second embodiment of the present invention.

Subsequently, a double-skin structure 70 of a second modification example of the second embodiment will be described with reference to FIGS. 6 and 7. In FIGS. 6 and 7, the same reference symbols will be assigned to the same configuration elements as those of the structure shown in FIG. 4. FIG. 7 shows a first mold member and a second mold member which are connected together.

The double-skin structure 70 has the same configuration as that of the double-skin structure 45 of the second embodiment except that the double-skin structure 70 has a first mold member 71 and a second mold member 72 instead of the first mold member 46 and the second mold member 47 of the double-skin structure 45, and has bonding portions 75 and 78.

The first mold member 71 has the same configuration as that of the first mold member 46 except that the first mold member 71 has a first groove boundary plate 81. The first groove boundary plate 81 is provided on the upper surface 28a of the first projection portion 28, and is positioned closer to the end portion 28A of the first projection portion 28 than the first rib 24. The first groove boundary plate 81 extends upward of the first projection portion 28.

The first groove boundary plate 81 is perpendicular to the upper surface 28a of the first projection portion 28. A first groove 83 is bounded between the first groove boundary plate 81 and the first rib 24, and the first side wall plate 54 can be inserted into the first groove 83. The width of the first groove 83 in the X direction is greater than a value of the thickness of the first side wall plate 54. The height of the first groove boundary plate 81 is set such that the first groove boundary plate 81 does not reach the cover plate 53.

A third gap 73 is formed between the first groove boundary plate 81 and the first side wall plate 54 in a state where the first side wall plate 54 is inserted into the first groove 83.

The second mold member 72 has the same configuration as that of the second mold member 47 except that the second mold member 72 has a second groove boundary plate 82. The second groove boundary plate 82 is provided on the upper surface 38a of the second projection portion 38, and is positioned closer to the end portion 38A of the second projection portion 38 than the second rib 34. The second groove boundary plate 82 extends upward of the second projection portion 38.

The second groove boundary plate 82 is perpendicular to the upper surface 38a of the second projection portion 38. A second groove 84 is bounded between the second groove boundary plate 82 and the second rib 34, and the second side wall plate 55 can be inserted into the second groove 84. The width of the second groove 84 in the X direction is greater than a value of the thickness of the second side wall plate 55. The height of the second groove boundary plate 82 is set such that the second groove boundary plate 82 does not reach the cover plate 53.

A fourth gap 77 is formed between the second groove boundary plate 82 and the second side wall plate 55 in a state where the second side wall plate 55 is inserted into the second groove 84.

The bonding portion 75 is provided between the first groove boundary plate 81 and the first side wall plate 54 in such a manner that the third gap 73 is filled with the bonding portion 75. The bonding portion 75 bonds together the first groove boundary plate 81 and the first side wall plate 54.

The bonding portion 78 is provided between the second groove boundary plate 82 and the second side wall plate 55 in such a manner that the fourth gap 77 is filled with the bonding portion 78. The bonding portion 78 bonds together the second groove boundary plate 82 and the second side wall plate 55.

The same adhesive as that forming the bonding portions 18 and 19 described in the first embodiment can be used as an adhesive forming the bonding portions 75 and 78.

In the double-skin structure 70 of the second modification example of the second embodiment, not only the bonding portion 75 is disposed between an external surface of the first side wall plate 54 and the first rib 24 and between an internal surface of the first side wall plate 54 and the first groove boundary plate 81, but also the bonding portion 78 is disposed between an external surface of the second side wall plate 55 and the second rib 34 and between an internal surface of the second side wall plate 55 and the second groove boundary plate 82.

Therefore, both sides of the first side wall plate 54 and both sides of the second side wall plate 55 in an arrangement direction (X direction) of the first mold member 71 and the second mold member 72 are bonded, respectively, and thus it is possible to ensure a sufficient bonding strength not only when an external force is applied to the first mold member 71 and the second mold member 72 in a direction where the first mold member 71 and the second mold member 72 approach each other, but also when an external force is applied to the first mold member 71 and the second mold member 72 in a direction where the first mold member 71 and the second mold member 72 become spaced apart from each other.

It is possible to manufacture the double-skin structures 45, 60, and 70 via the same technique as that used in the manufacturing of the double-skin structure 10 of the first embodiment, and to obtain the same effects.

Third Embodiment

Figure 8:
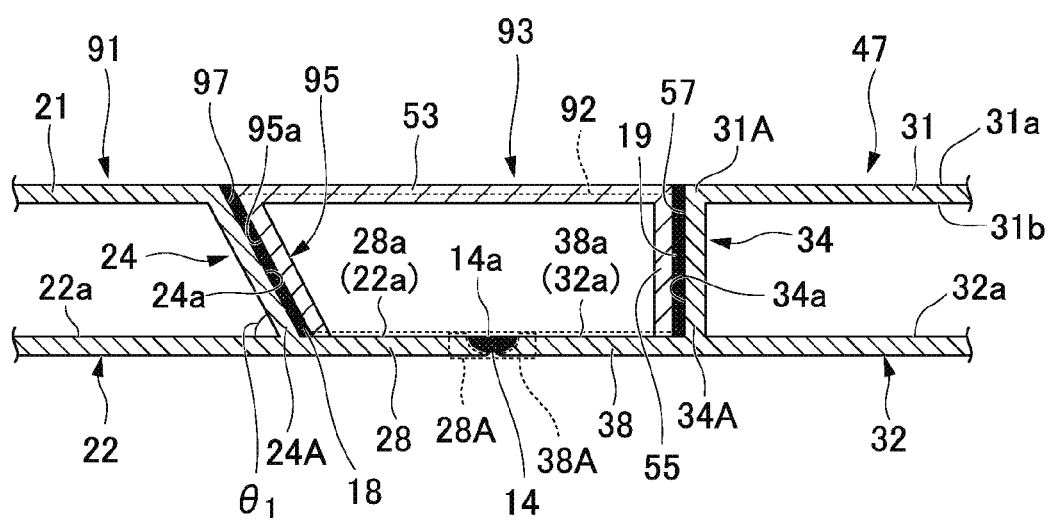
FIG. 8 is a cross-sectional view showing a schematic configuration of a double-skin structure according to a third embodiment of the present invention.

A double-skin structure 90 of a third embodiment will be described with reference to FIG. 8. In FIG. 8, the same reference symbols will be assigned to the same configuration elements as those of the structure shown in FIG. 4.

The double-skin structure 90 of the third embodiment has the same configuration as that of the double-skin structure 45 of the second embodiment except that the double-skin structure 90 has a first mold member 91 and a cover portion 93 instead of the first mold member 46 and the cover portion 49 of the double-skin structure 45.

The first mold member 91 has the same configuration as that of the first mold member 11 except that the first extension portion 26 is removed from the configuration of the first mold member 11 described in the first embodiment. That is, the first rib 24 of the first mold member 91 is inclined with respect to the upper surface 22a of the first lower plate 22.

A recessed portion 92 is formed between the first mold member 91 and the second mold member 47, and extends in the Y direction.

The cover portion 93 is provided in the recessed portion 92, and blocks an upper end side of the recessed portion 92. The cover portion 93 has the same configuration as that of the cover portion 49 except that the cover portion 93 has a first side wall plate 95 instead of the first side wall plate 54 of the cover portion 49.

The first side wall plate 95 is provided in an end portion (positioned close to the first rib 24) of the cover plate 53. The first side wall plate 95 is inclined with respect to the first lower plate 22 (upper surface 22a) in the same direction as an inclination direction of the first rib 24. The first side wall plate 95 has an external surface 95a parallel with the external surface 24a of the first rib 24. A first gap 97 is formed between the first side wall plate 95 and the first rib 24, and is inclined with respect to the first lower plate 22 (upper surface 22a).

The bonding portion 18 is provided in such a manner that the first gap 97 is filled with the bonding portion 18.

In the double-skin structure 90 of the third embodiment, because the first rib 24 and the first side wall plate 95 are disposed inclinedly in the same direction with respect to the first lower plate 22, it is possible to reduce stress concentration in an upper end portion of the bonding portion 18 disposed between an upper end portion of the first rib 24 and an upper end portion of the first side wall plate 95 compared to when the first rib 24 and the first side wall plate 95 are perpendicular to the first lower plate 22.

Because it is possible to increase the bonding area between the first rib 24 and the first side wall plate 95 compared to when the first rib 24 and the first side wall plate 95 are perpendicular to the first lower plate 22, it is possible to improve the bonding strength of the bonding portion 18.

In one example described in the third embodiment, the first rib 24 and the first side wall plate 95 are disposed inclinedly in the same direction with respect to the first lower plate 22; however, the first rib 24 and the first side wall plate 95 may be perpendicular to the upper surface 22a of the first lower plate 22, and the second rib 34 and the second side wall plate 55 may be disposed inclinedly in the same direction with respect to the second lower plate 32.

If the second rib 34 and the second side wall plate 55 are disposed inclinedly in the same direction with respect to the second lower plate 32, it is possible to reduce stress concentration in an upper end portion of the bonding portion 19 disposed between an upper end portion of the second rib 34 and an upper end portion of the second side wall plate 55.

Because it is possible to increase the bonding area between the second rib 34 and the second side wall plate 55 compared to when the second rib 34 and the second side wall plate 55 are perpendicular to the second lower plate 32, it is possible to improve the bonding strength of the bonding portion 19.

Figure 9:
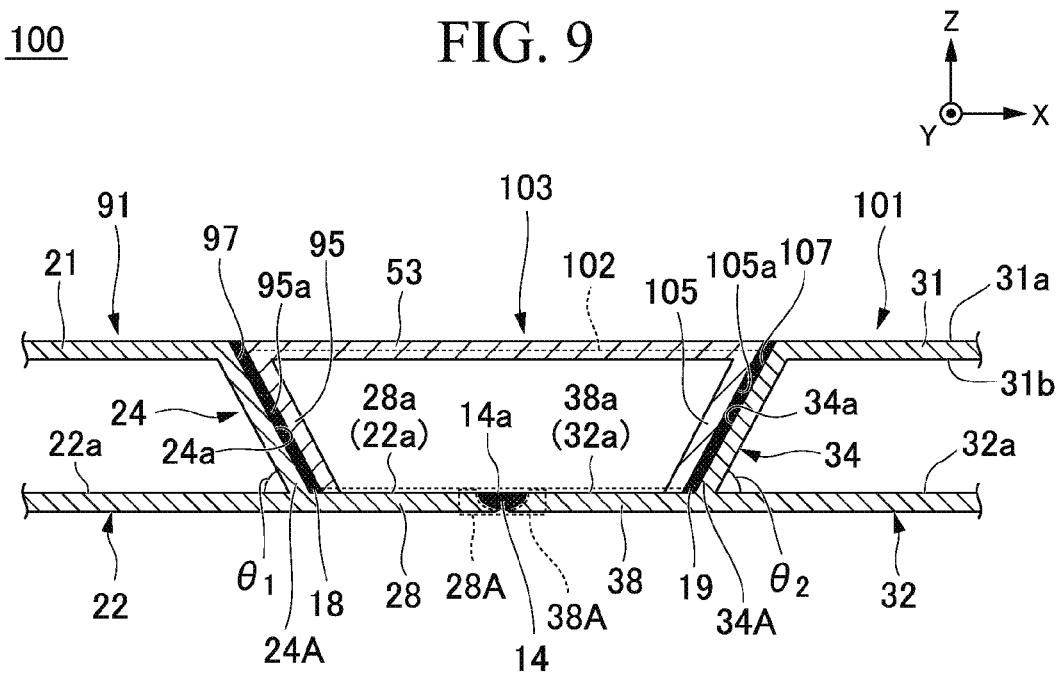
FIG. 9 is a cross-sectional view showing a schematic configuration of a double-skin structure according to a first modification example of the third embodiment of the present invention.

Subsequently, a double-skin structure 100 of a first modification example of the third embodiment will be described with reference to FIG. 9. In FIG. 9, the same reference symbols will be assigned to the same configuration elements as those of the structures shown in FIGS. 1, 2, and 8.

The double-skin structure 100 has the same configuration as that of the double-skin structure 90 of the third embodiment except that the double-skin structure 100 has a second mold member 101 and a cover portion 103 instead of the second mold member 47 and the cover portion 93 of the double-skin structure 90.

The second mold member 101 has the same configuration as that of the second mold member 12 except that the second extension portion 36 is removed from the configuration elements of the second mold member 12 described in the first embodiment. That is, the second rib 34 of the second mold member 101 is inclined with respect to the upper surface 32a of the second lower plate 32.

A recessed portion 102 is formed between the first mold member 91 and the second mold member 101, and extends in the Y direction. The recessed portion 102 has a truncated cone-shaped cross-sectional shape in which the width of the recessed portion 102 in the X direction decreases from the first upper plate 21, the second upper plate 31 and the first lower plate 22, the second lower plate 32.

The cover portion 103 is provided in the recessed portion 102, and blocks an upper end side of the recessed portion 102. The cover portion 103 has the same configuration as that of the cover portion 93 except that the cover portion 103 has a second side wall plate 105 instead of the second side wall plate 55 of the cover portion 93.

The second side wall plate 105 is provided in an end portion (positioned close to the second rib 34) of the cover plate 53. The second side wall plate 105 is inclined with respect to the second lower plate 32 (upper surface 32a) in the same direction as an inclination direction of the second rib 34. The second side wall plate 105 has an external surface 105a parallel with the external surface 34a of the second rib 34. A second gap 107 is formed between the second side wall plate 105 and the second rib 34, and is inclined with respect to the second lower plate 32 (upper surface 32a).

The bonding portion 19 is provided in such a manner that the second gap 107 is filled with the bonding portion 19.

In the double-skin structure 100 of the first modification example of the third embodiment, because the first rib 24 and the first side wall plate 95 are disposed inclinedly in the same direction with respect to the first lower plate 22, and the second rib 34 and the second side wall plate 105 are disposed inclinedly in the same direction with respect to the second lower plate 32, it is possible to reduce stress concentration in an upper end portion of the bonding portion 18 disposed between an upper end portion of the first rib 24 and an upper end portion of the first side wall plate 95, and stress concentration in an upper end portion of the bonding portion 19 disposed between an upper end portion of the second rib 34 and an upper end portion of the second side wall plate 105.

Therefore, it becomes difficult for the bonding portions 18 and 19 to peel off from the upper end portion of the first rib 24, the upper end portion of the first side wall plate 95, the upper end portion of the second rib 34, and the upper end portion of the second side wall plate 105, and thus it is possible to increase the bonding strength of each of the bonding portions 18 and 19.

Because it is possible to increase the bonding area between the first rib 24 and the first side wall plate 95, and a bonding area between the second rib 34 and the second side wall plate 105, it is possible to improve the bonding strength of each of the bonding portions 18 and 19.

Figure 10:
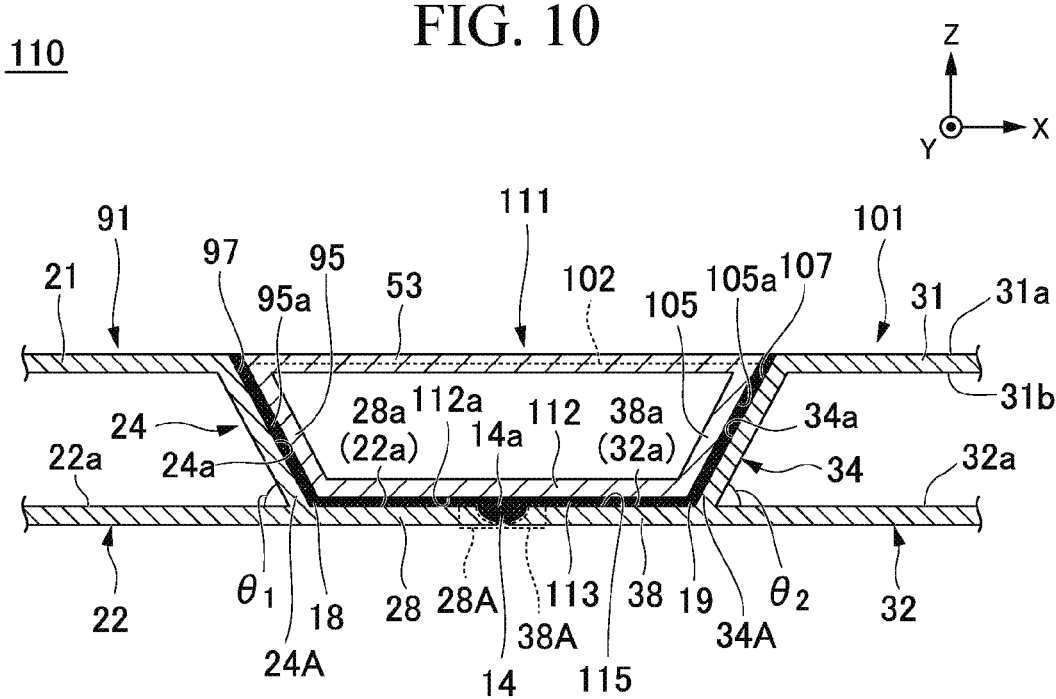
FIG. 10 is a cross-sectional view showing a schematic configuration of a double-skin structure according to a second modification example of the third embodiment of the present invention.

Subsequently, a double-skin structure 110 of a second modification example of the third embodiment will be described with reference to FIG. 10.

The double-skin structure 110 has the same configuration as that of the double-skin structure 100 except that the double-skin structure 110 has a cover portion 111 with a bottom plate 112 instead of the cover portion 103 of the double-skin structure 100 of the first modification example of the third embodiment, and a bonding portion 113.

The bottom plate 112 is provided to connect together a lower end of the first side wall plate 95 and a lower end of the second side wall plate 105. The bottom plate 112 has an external surface 112*a* that faces the upper surface 28*a* of the first projection portion 28, the upper surface 38*a* of the second projection portion 38, and the upper surface 14*a* of the connection portion 14 when the cover portion 111 is disposed in the recessed portion 102.

The bottom plate 112 has a third gap 115 between the upper surface 28*a* of the first projection portion 28, the upper surface 38*a* of the second projection portion 38, the upper surface 14*a* of the connection portion 14 and the external surface 112*a*.

The bonding portion 113 is provided in the third gap in such a manner that the third gap 115 is filled with the bonding portion 113. Therefore, the bonding portion 113 bonds the first projection portion 28, the second projection portion 38, and the connection portion 14 to the bottom plate 112.

The double-skin structure 110 having such configuration according to the second modification example of the third embodiment can realize effects of the double-skin structure 100 of the first modification example of the third embodiment, and effects of the double-skin structure 60 of the first modification example of the second embodiment.

Figure 11:
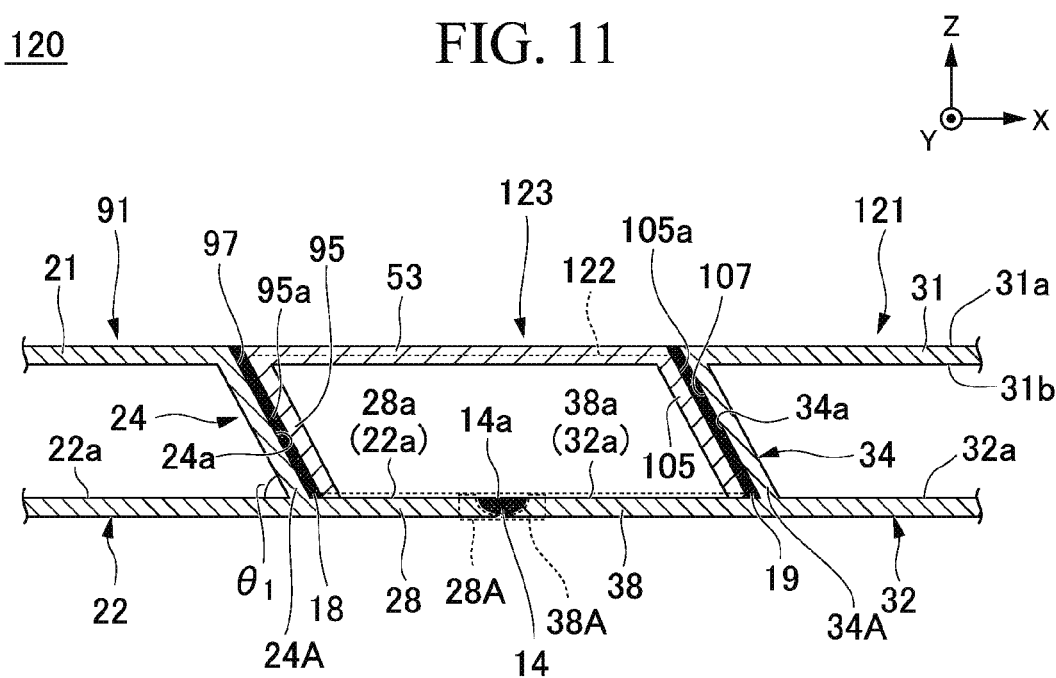
FIG. 11 is a cross-sectional view showing a schematic configuration of a double-skin structure according to a third modification example of the third embodiment of the present invention.

Subsequently, a double-skin structure 120 of a third modification example of the third embodiment will be described with reference to FIG. 11. In FIG. 11, the same reference symbols will be assigned to the same configuration elements as those of the structure shown in FIG. 9.

The double-skin structure 120 has the same configuration as that of the double-skin structure 100 of the first modification example of the third embodiment except that the double-skin structure 120 has a second mold member 121 and a cover portion 123 instead of the second mold member 101 and the cover portion 103 of the double-skin structure 100.

The second mold member 121 has the same configuration as that of the second mold member 101 except that the second rib 34 of the second mold member 121 is inclined in the same direction as an inclination direction of the first rib 24.

The cover portion 123 has the same configuration as that of the cover portion 103 except that the second side wall plate 105 of the cover portion 123 is inclined in the same direction as the inclination direction of the first rib 24.

Therefore, the second gap 107 is formed between the second rib 34 and the second side wall plate 105, and is inclined in the same direction as an inclination direction of the first gap 97. The second gap 107 is filled with the bonding portion 19.

In the double-skin structure 120 having such configuration according to the third modification example of the third embodiment, it is possible to obtain the same effects as those of the double-skin structure 100 of the first modification example of the third embodiment.

It is possible to manufacture the double-skin structures 90, 100, 110, and 120 via the same technique as that used in the manufacturing of the double-skin structure 10 of the first embodiment, and to obtain the same effects.

Fourth Embodiment

Figure 12:
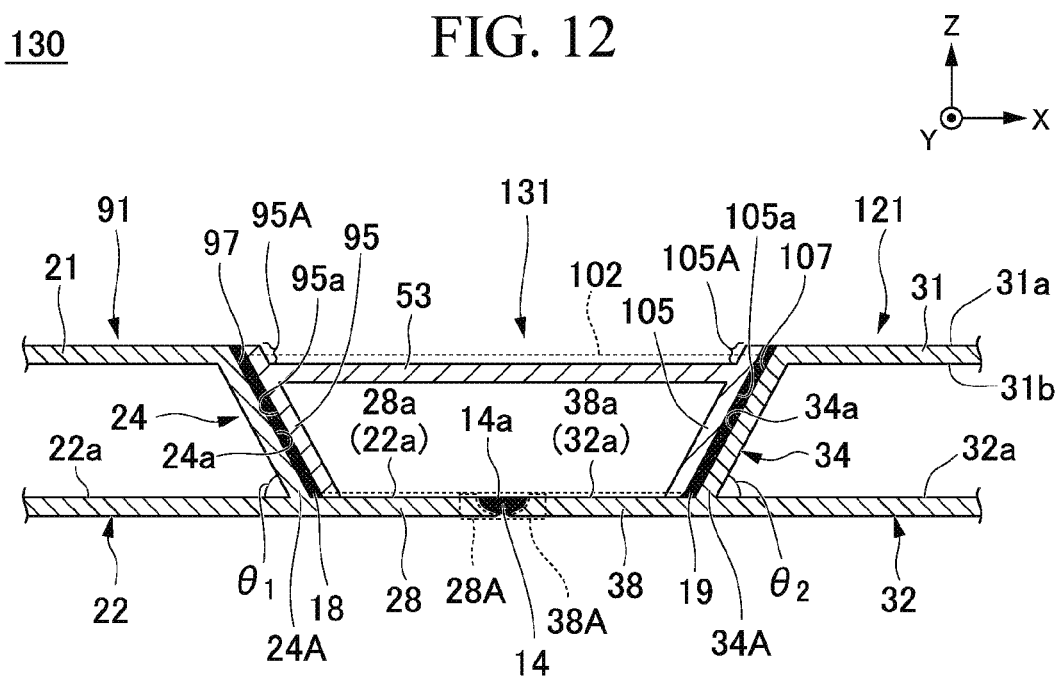
FIG. 12 is a cross-sectional view showing a schematic configuration of a double-skin structure according to a fourth embodiment of the present invention.

A double-skin structure 130 of a fourth embodiment of the present invention will be described with reference to FIG. 12. In FIG. 12, the same reference symbols will be assigned to the same configuration elements as those of the structure shown in FIG. 9.

The double-skin structure 130 has the same configuration as that of the double-skin structure 100 of the first modification example of the third embodiment except that the double-skin structure 130 has a cover portion 131 instead of the cover portion 103 of the double-skin structure 100.

The cover portion 131 has the same configuration as that of the cover portion 103 except that the first side wall plate 95 and the second side wall plate 105 are respectively connected to the cover plate 53 at positions lower than those of an upper end portion 95A of the first side wall plate 95 and an upper end portion 105A of the second side wall plate 105.

In the double-skin structure 130 of the fourth embodiment, because the first side wall plate 95 and the second side wall plate 105 are respectively connected to the cover plate 53 at the positions lower than those of the upper end portion 95A of the first side wall plate 95 and the upper end portion 105A of the second side wall plate 105, it is possible to reduce stress concentration in an upper end portion of the bonding portion 18 disposed between the upper end portion of the first rib 24 and the upper end portion 95A of the first side wall plate 95, and stress concentration in an upper end portion of the bonding portion 19 disposed between the upper end portion of the second rib 34 and the upper end portion 105A of the second side wall plate 105.

Therefore, it becomes difficult for the bonding portions 18 and 19 to peel off from the upper end portion of the first rib 24, the upper end portion 95A of the first side wall plate 95, the upper end portion of the second rib 34, the upper end portion 105A of the second side wall plate 105, and thus it is possible to increase the bonding strength of each of the bonding portions 18 and 19.

Figure 13:
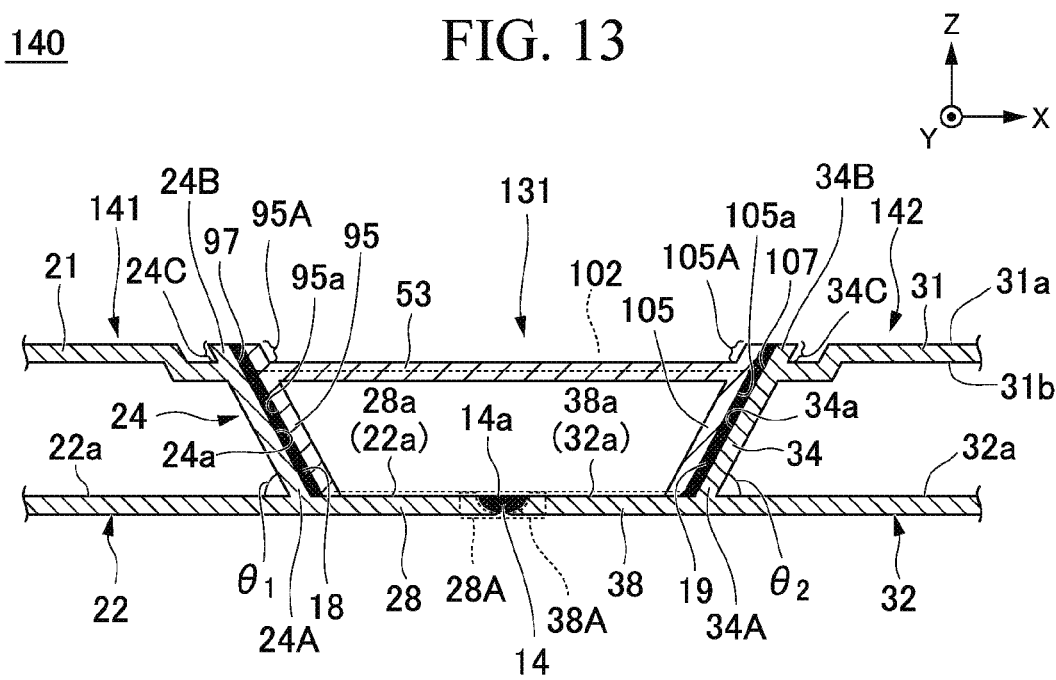
FIG. 13 is a cross-sectional view showing a schematic configuration of a double-skin structure according to a first modification example of the fourth embodiment of the present invention.

Subsequently, a double-skin structure 140 of a modification example of the fourth embodiment will be described with reference to FIG. 13. In FIG. 13, the same reference symbols will be assigned to the same configuration elements as those of the structure shown in FIG. 12.

The double-skin structure 140 has the same configuration as that of the double-skin structure 130 except that the double-skin structure 140 has a first mold member 141 and a second mold member 142 instead of the first mold member 91 and the second mold member 121 of the double-skin structure 130.

The first mold member 141 has the same configuration as that of the first mold member 91 except that the first upper plate 21 and the first rib 24 are connected together at a position lower than that of an upper end portion 24C (portion wider than the upper end 24B of the first rib 24) of the first rib 24.

The second mold member 142 has the same configuration as that of the second mold member 121 except that the second upper plate 31 and the second rib 34 are connected together at a position lower than that of an upper end portion 34C (portion wider than the upper end 34B of the second rib 34) of the second rib 34.

In the double-skin structure 140 of the modification example of the fourth embodiment, because the first side wall plate 95 and the second side wall plate 105 are connected to the cover plate 53 at a position lower than those of the upper end portion 95A of the first side wall plate 95 and the upper end portion 105A of the second side wall plate 105, the first rib 24 and the first upper plate 21 are connected together at the position lower than that of the upper end portion 24C of the first rib 24, and the second rib 34 and the second upper plate 31 are connected together at the position lower than that of the upper end portion 34C of the second rib 34, it is possible to further reduce stress concentration in an upper end portion of each of the bonding portions 18 and 19.

Therefore, it becomes difficult for the bonding portions 18 and 19 to peel off from the upper end portion 24C of the first rib 24, the upper end portion 95A of the first side wall plate 95 and the upper end portion of the second rib 34, the upper end portion 105A of the second side wall plate 105, respectively, and thus it is possible to further increase the bonding strength of each of the bonding portions 18 and 19.

It is possible to manufacture the double-skin structures 130 and 140 via the same technique as that used in the manufacturing of the double-skin structure 10 of the first embodiment, and to obtain the same effects.

It is possible to use each of the double-skin structures (each structure including a first mold member, a second mold member, a cover portion, and the bonding portion) 10, 45, 60, 70, 90, 100, 110, 120, 130, and 140 as a floor of a vehicle.

Because each of the double-skin structures 10, 45, 60, 70, 90, 100, 110, 120, 130, and 140 is used as the floor of the vehicle, it is possible to improve the aesthetic of the floor of the vehicle in addition to restricting an increase in the number of manufacturing steps for the floor of the vehicle.

Fifth Embodiment

Figure 14:
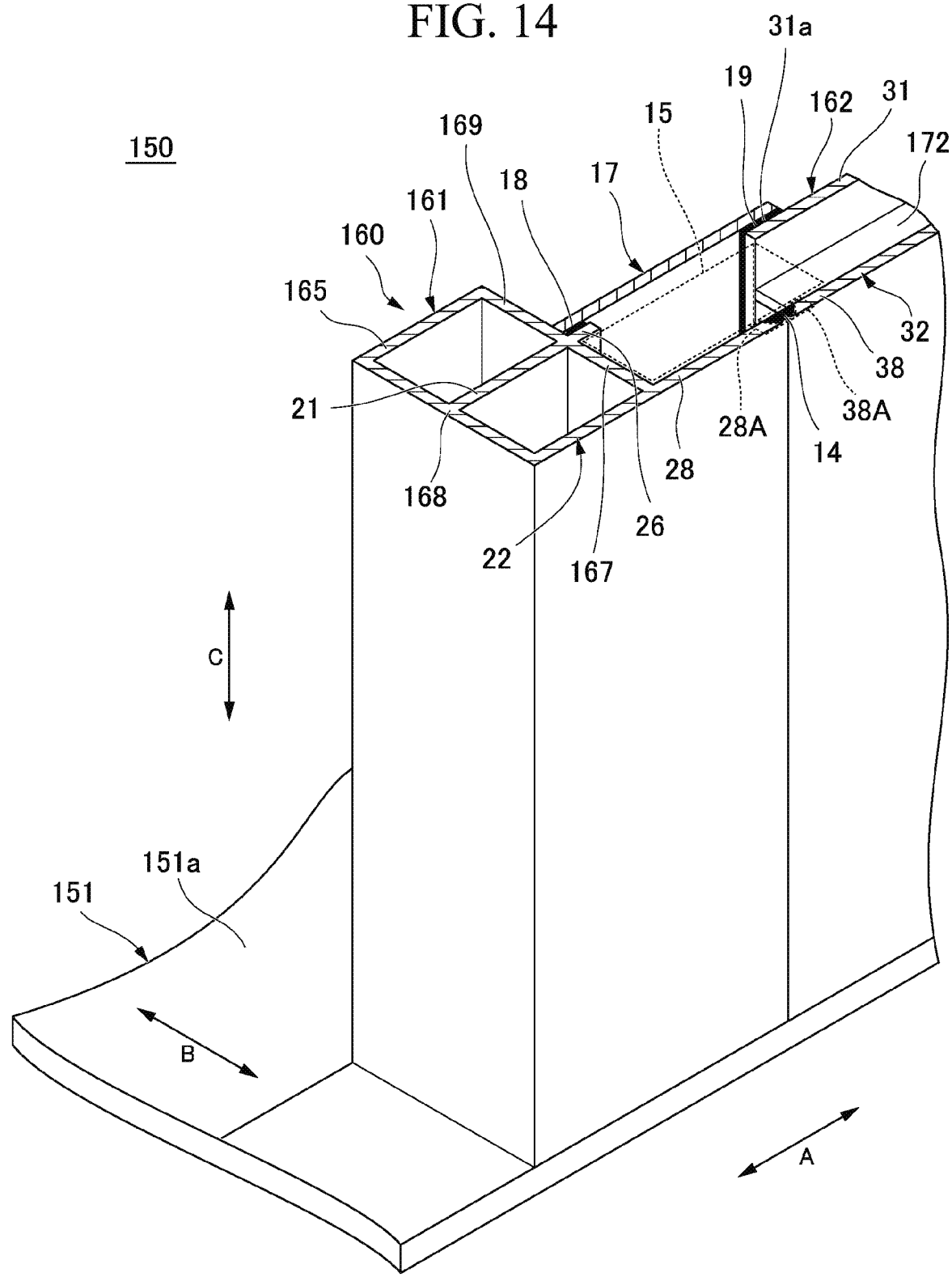
FIG. 14 is a perspective view showing a schematic configuration of main parts of a vehicle to which a double-skin structure of a fifth embodiment of the present invention is applied.

FIG. 14 is a perspective view showing a schematic configuration of main parts of a vehicle to which a double-skin structure of a fifth embodiment of the present invention is applied. FIG. 14 is a cross-sectional view showing an upper portion of each of a door column 161, a side structure 162, and the cover plate 17.

In FIG. 14, the same reference symbols will be assigned to the same configuration elements as those of the structure shown in FIG. 1. In FIG. 14, reference symbol A denotes a longitudinal direction of a vehicle 150 (hereinbelow, referred to as a "longitudinal direction A of the vehicle 150"), reference symbol B denotes a width direction of the vehicle 150 (hereinbelow, referred to as a "width direction B of the vehicle 150") which is perpendicular to the longitudinal direction A of the vehicle 150, and reference symbol C denotes a height direction of the vehicle 150 (hereinbelow, referred to as a "height direction C of the vehicle 150") which is perpendicular to the longitudinal direction A and the width direction B of the vehicle 150.

In FIG. 14, the same reference symbols will be assigned to the same configuration elements as those of the structure shown in FIG. 1.

Figure 15:
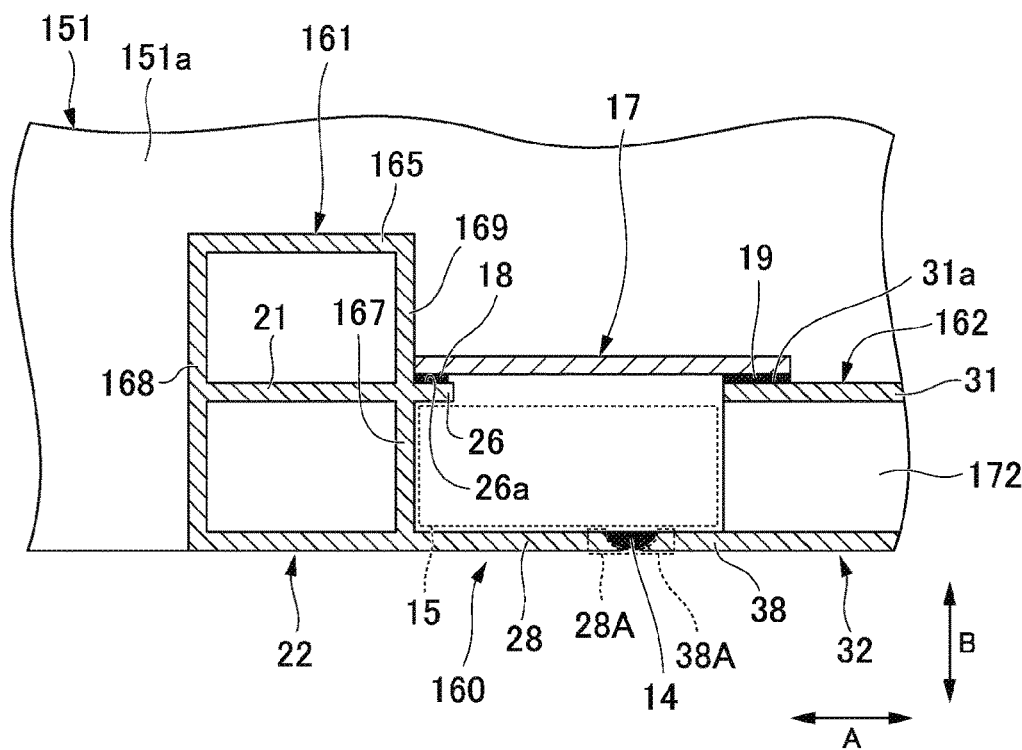
FIG. 15 is a plan view as seen from an upper surface side of the vehicle shown in FIG. 14.

FIG. 15 is a plan view as seen from an upper surface side of the vehicle shown in FIG. 14. In FIG. 15, the same reference symbols will be assigned to the same configuration elements as those of the structure shown in FIG. 14.

With reference to FIGS. 14 and 15, a double-skin structure 160 of the fifth embodiment is applied to the vehicle 150, and has the door column 161; the side structure 162; the connection portion 14; the cover plate 17; and the bonding portions 18 and 19.

The door column 161 is provided on a floor 151 of the vehicle 150, and extends upward from an upper surface 151a of the floor 151. The door column 161 is disposed to face the side structure 162 in the longitudinal direction A of the vehicle 150.

The door column 161 has the first lower plate 22 and the first upper plate 21 of the first mold member 11 described in the first embodiment; a plate 165; a first rib 167; a rib 168; a third rib 169; and the first extension portion 26.

Each of the first lower plate 22, the first upper plate 21, and the plate 165 is a rectangular planar material having the height direction C of the vehicle 150 as a longitudinal direction. The first lower plate 22, the first upper plate 21, and the plate 165 extend in the longitudinal direction A of the vehicle 150.

The first lower plate 22, the first upper plate 21, and the plate 165 are disposed to face each while being spaced apart from each other in the width direction B of the vehicle 150. The first lower plate 22 is disposed in an end portion (positioned in the width direction B of the vehicle 150) of the floor 151. The first upper plate 21 is disposed inward from the first lower plate 22. The plate 165 is disposed inward from the first upper plate 21.

The first lower plate 22 has the first projection portion 28 that projects from the first rib 167 to one side in the longitudinal direction A of the vehicle 150.

The first rib 167 is a rectangular planar material having the height direction C of the vehicle 150 as a longitudinal direction. The first rib 167 extends from one end (one end disposed in the longitudinal direction A of the vehicle 150) of the first lower plate 22 to one end (one end disposed in the longitudinal direction A of the vehicle 150) of the first upper plate 21.

The first rib 167 connects one end of the first lower plate 22 to one end of the first upper plate 21. The first rib 167 is perpendicular to the first lower plate 22 and the first upper plate 21.

The third rib 169 is a rectangular planar material having the height direction C of the vehicle 150 as a longitudinal direction. The third rib 169 extends from an end of the first rib 167 to one end (one end disposed in the longitudinal direction A of the vehicle 150) of the plate 165.

The third rib 169 connects together the first rib 167 and the plate 165. The third rib 169 is perpendicular to the first lower plate 22 and the first upper plate 21.

The rib 168 is a rectangular planar material having the height direction C of the vehicle 150 as a longitudinal direction. The rib 168 extends from the other end (the other end disposed in the longitudinal direction A of the vehicle 150) of the first lower plate 22 to the other end (the other end disposed in the longitudinal direction A of the vehicle 150) of the plate 165.

The rib 168 connects together the other respective ends of the first lower plate 22, the first upper plate 21, and the plate 165. The rib 168 is perpendicular to the first lower plate 22, the first upper plate 21, and the plate 165.

The first extension portion 26 extends from an opposite side of a portion (to which the first upper plate 21 is connected) of the first rib 167 in the longitudinal direction A of the vehicle 150. The first extension portion 26 has an upper surface 26a on which the bonding portion 18 is provided.

An extruded member obtained by extruding a material in the height direction C of the vehicle 150 may be used as the door column 161.

Because an extruded member obtained by extruding a material in the height direction C of the vehicle 150 is used as the door column 161, it is possible to easily form the first extension portion 26 and the first projection portion 28.

The side structure 162 has the second upper plate 31; the second lower plate 32; and a second rib 172. Each of the second upper plate 31 and the second lower plate 32 is a planar material having the height direction C of the vehicle 150 as a longitudinal direction.

The second upper plate 31 and the second lower plate 32 extend in the longitudinal direction A of the vehicle 150. The second upper plate 31 and the second lower plate 32 are disposed in the width direction B of the vehicle 150. The second upper plate 31 faces the first extension portion 26 while being spaced apart from the first extension portion 26 in the longitudinal direction A of the vehicle 150.

The second lower plate 32 faces the first lower plate 22 in the longitudinal direction A of the vehicle 150. The second lower plate 32 has the second projection portion 38 that further projects to one side in the longitudinal direction A of the vehicle 150 than the second upper plate 31.

The connection portion 14 is disposed between the end portion 38A of the second projection portion 38 and the end portion 28A of the first projection portion 28.

The second rib 172 is disposed between the second upper plate 31 and the second lower plate 32, and connects together the second upper plate 31 and the second lower plate 32.

An extruded member obtained by extruding a material in the longitudinal direction A of the vehicle 150 may be used as the side structure 162.

Because an extruded member obtained by extruding a material in the longitudinal direction A of the vehicle 150 is used as the side structure 162, it is possible to easily form the second projection portion 38.

The cover plate 17 is a planar material having the height direction of the vehicle as a longitudinal direction, and extends in the longitudinal direction A of the vehicle 150. One end portion of a pair of end portions (disposed in the longitudinal direction A of the vehicle 150) of the cover plate 17 faces the first extension portion 26 via the bonding portion 18, and the other end portion faces the upper surface 31a (positioned in an end portion of the second upper plate 31) via the bonding portion 19.

In the double-skin structure 160 of the fifth embodiment, because the door column 161 and the side structure 162 are connected together via the connection portion 14, and the door column 161 and the side structure 162 are bonded to the cover plate 17 via the bonding portions 18 and 19, respectively, it is possible to improve the aesthetic of the double-skin structure 160 in addition to restricting an increase in the number of manufacturing steps for the double-skin structure 160.

Sixth Embodiment

Figure 16:
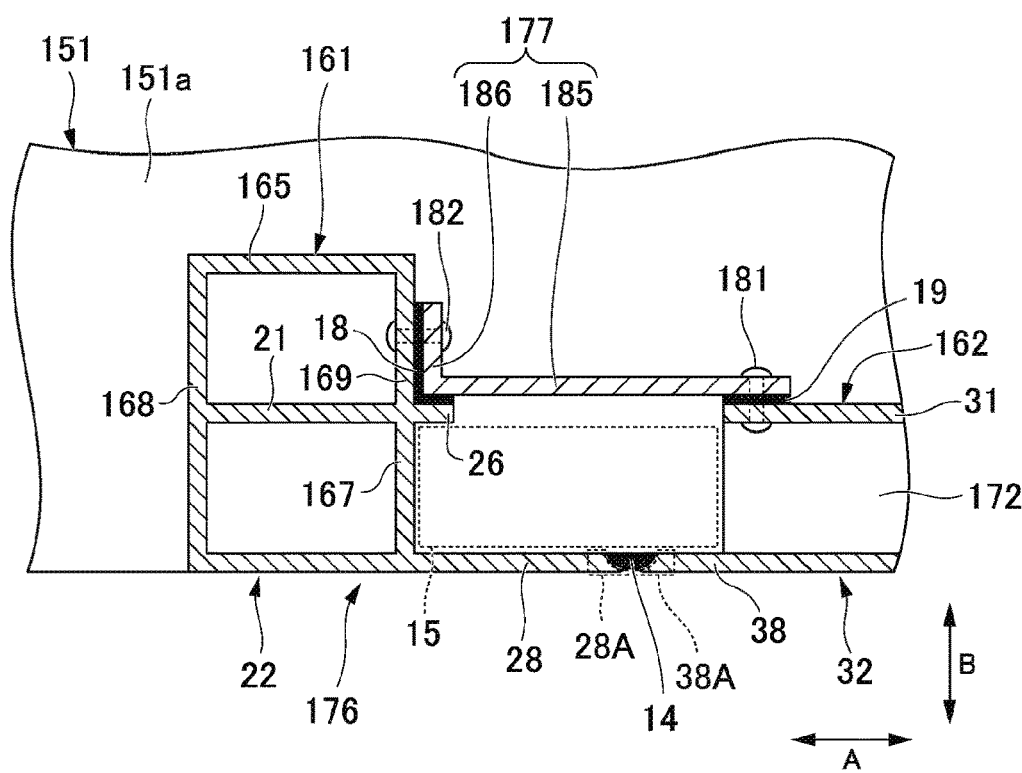
FIG. 16 is a plan view of a schematic configuration of main parts of a vehicle as seen from an upper surface side of the vehicle to which a double-skin structure of a sixth embodiment of the present invention is applied, and is a cross-sectional view showing an upper portion of each of a door column, a side structure, and a cover portion.

A double-skin structure 176 of a sixth embodiment of the present invention will be described with reference to FIG. 16.

The double-skin structure 176 is applied to a vehicle 175. The double-skin structure 176 has the same configuration as that of the double-skin structure 160 of the fifth embodiment except that the double-skin structure 176 has a cover portion 177 instead of the cover plate 17 of the double-skin structure 160, and further has a first connection member 181 and a second connection member 182.

The cover portion 177 has a cover portion body 185 having the same configuration as that of the cover plate 17 described in the fifth embodiment, and a connection part 186.

The cover portion body 185 is bonded to the first extension portion 26 via the bonding portion 18. The cover portion body 185 is bonded to the second upper plate 31 via the bonding portion 19.

The connection part 186 extends inward from an end portion (disposed close to the door column 161) of the cover portion body 185 in the width direction B of the vehicle 175. The connection part 186 faces the third rib 169 in the longitudinal direction A of the vehicle 175. The bonding portion 18 is disposed between the connection part 186 and the third rib 169.

The first connection member 181 is disposed such that the first connection member 181 penetrates through the cover portion body 185 and the second upper plate 31 from the cover portion body 185. The first connection member 181 mechanically connects together the cover portion body 185 and the second upper plate 31.

The second connection member 182 is disposed such that the second connection member 182 penetrates through the connection part 186 and the third rib 169 from the connection part 186. The second connection member 182 mechanically connects together the connection part 186 and the third rib 169.

A rivet or a flow drill screw (FDS) can be used as the first connection member 181 and the second connection member 182.

In the double-skin structure 176 of the sixth embodiment, because the cover portion 177 has the connection part 186 facing the third rib 169, and the bonding portion 18 is provided between the third rib 169 and the connection part 186, the bonding portion 18 is disposed also in a direction (for example, perpendicular direction in the embodiment) intersecting the longitudinal direction A of the vehicle 175.

That is, the bonding portion 18 is disposed between the cover portion 177 and the door column 161 both in the direction intersecting the longitudinal direction of the vehicle and in a direction intersecting the width direction of the vehicle (for example, perpendicular direction in the embodiment). Therefore, it is possible to increase the bonding strength between the door column 161 and the cover portion 177 which are likely to receive a load greater than that applied to the side structure 162.

Because the double-skin structure 176 has the first connection member 181 that mechanically connects together the cover portion body 185 and the second upper plate 31 while penetrating therethrough from the cover portion body 185, and the second connection member 182 that mechanically connects together the third rib 169 and the connection part 186 while penetrating therethrough from the connection part 186, it is possible to increase a connection strength between the cover portion 177 and the door column 161, and a connection strength between the cover portion 177 and the side structure 162.

Seventh Embodiment

Figure 17:
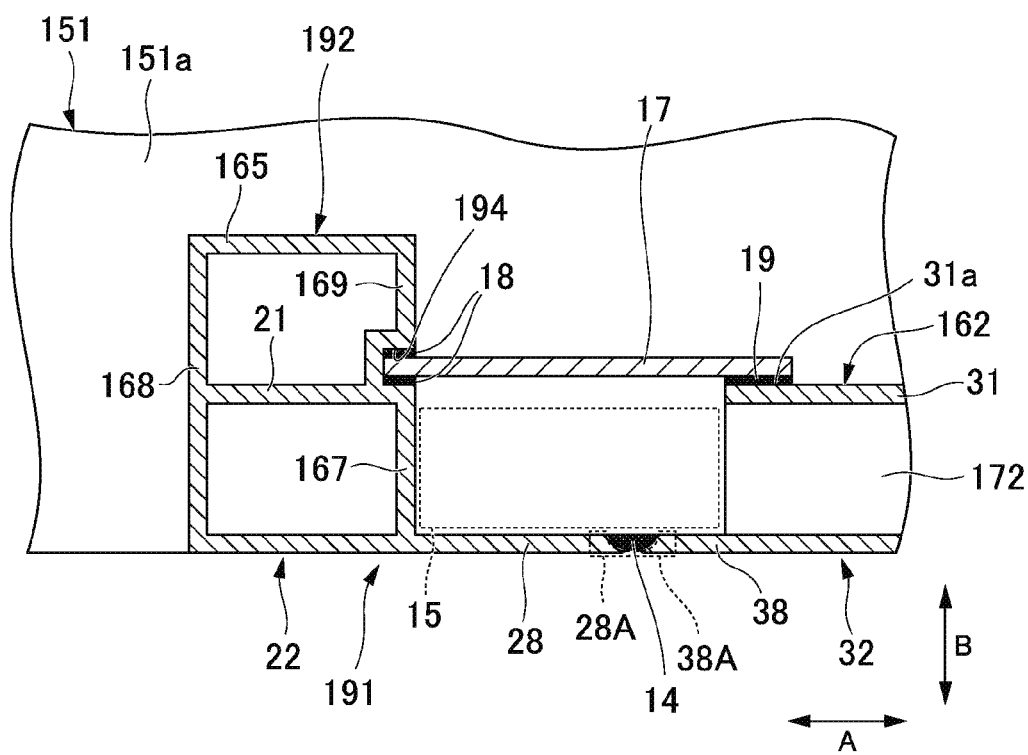
FIG. 17 is a plan view of a schematic configuration of main parts of a vehicle as seen from an upper surface side of the vehicle to which a double-skin structure of a seventh embodiment of the present invention is applied, and is a cross-sectional view showing an upper portion of each of a door column, a side structure, and a cover plate.

A double-skin structure 191 of a seventh embodiment will be described with reference to FIG. 17. In FIG. 17, the same reference symbols will be assigned to the same configuration elements as those of the structure shown in FIG. 15.

The double-skin structure 191 forms part of a vehicle 190. The double-skin structure 191 has the same configuration as that of the double-skin structure 160 of the fifth embodiment except that the double-skin structure 191 has a door column 192 instead of the door column 161 of the double-skin structure 160.

The door column 192 has the same configuration as that of the door column 161 except that an end portion accommodating portion 194 (recessed portion into which an end portion of the cover plate 17 is inserted) is formed between the third rib 169 and the first upper plate 21, the bonding portion 18 is provided between the first upper plate 21 and a surface (positioned outward in the width direction B of the vehicle 190) of the end portion of the cover plate 17, and the bonding portion 18 is provided between the third rib 169 and a surface (positioned inward in the width direction B of the vehicle 190) of the end portion of the cover plate 17.

An extruded member obtained by extruding a material in the height direction of the vehicle 190 may be used as the door column 192.

Because an extruded member obtained by extruding a material in the height direction of the vehicle 190 is used as the door column 192, it is possible to easily form the end portion accommodating portion 194.

In the double-skin structure 191 of the seventh embodiment, because the end portion accommodating portion 194 (into which the end portion of the cover plate 17 is inserted) is formed between the third rib 169 and the first upper plate 21, it is possible to regulate the position of the end portion of the cover plate 17.

Because the bonding portion 18 is provided between the first upper plate 21 and the surface (positioned outward in the width direction B of the vehicle 190) of the end portion of the cover plate 17, and the bonding portion 18 is provided between a fourth rib and the surface (positioned inward in the width direction B of the vehicle 190) of the end portion of the cover plate 17, it is possible to increase the bonding strength between the door column 192 and the end portion of the cover plate 17 which are likely to receive a load greater than that applied to the side structure 162.

Eighth Embodiment

Figure 18:
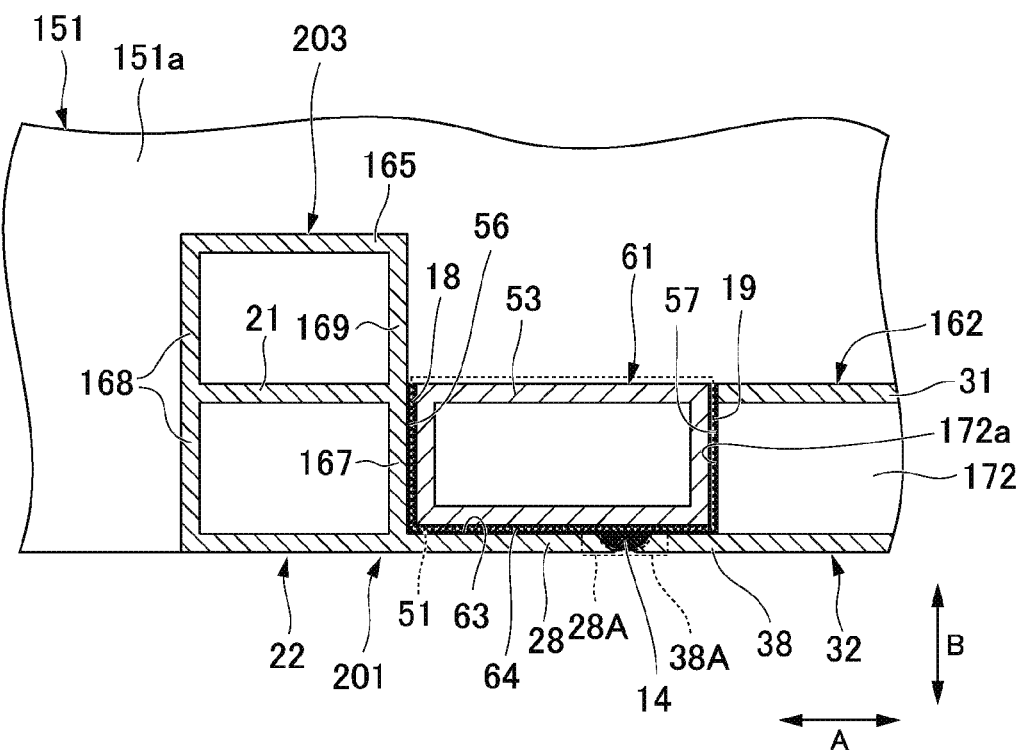
FIG. 18 is a plan view of a schematic configuration of main parts of a vehicle as seen from an upper surface side of the vehicle to which a double-skin structure of an eighth embodiment of the present invention is applied, and is a cross-sectional view showing an upper portion of each of a door column, a side structure, and a cover portion.

A double-skin structure 201 of an eighth embodiment will be described with reference to FIG. 18. In FIG. 18, the same reference symbols will be assigned to the same configuration elements as those of the structures shown in FIGS. 5 and 15.

The double-skin structure 201 forms part of a vehicle 200. The double-skin structure 201 has the same configuration as that of the double-skin structure 160 of the fifth embodiment except that the double-skin structure 191 has a door column 203 and the cover portion 61 instead of the door column 161 and the cover plate 17 of the double-skin structure 160, and further has the bonding portion 64.

The door column 203 has the same configuration as that of the door column 161 except that the first extension portion 26 is removed from the configuration elements of the door column 161.

The recessed portion 51 is formed between the door column 203 and the side structure 162. The recessed portion 51 accommodates the cover portion 61 while the first gap 56, the second gap 57, and the third gap 63 are interposed between the recessed portion 51 and the cover portion 61.

The first gap 56 is formed between the first rib 167 and the first side wall plate 54. The second gap 57 is formed between an end surface 172a of the second rib 172 and the second side wall plate 55. The third gap 63 is formed between the first projection portion 28, the second projection portion 38, the connection portion 14 and the bottom plate 62.

The bonding portion 18 is disposed in such a manner that the first gap 56 is filled with the bonding portion 18. The bonding portion 19 is disposed in such a manner that the second gap 57 is filled with the bonding portion 19. The bonding portion 64 is disposed in such a manner that the third gap 63 is filled with the bonding portion 64.

In the double-skin structure 201 of the eighth embodiment, the double-skin structure 201 has the cover portion 61 including the cover plate 53, the first side wall plate 54, the second side wall plate 55, and the bottom plate 62, the bonding portion 18 is disposed such that the first gap 56 formed between the first rib 167 and the first side wall plate 54 is filled with the bonding portion 18, the bonding portion 19 is disposed such that the second gap 57 formed between the second rib 172 and the second side wall plate 55 is filled with the bonding portion 19, and the bonding portion 64 is disposed such that the third gap 63 formed between the bottom plate 62 and the first projection portion 28, the second projection portion 38, the connection portion 14 is filled with the bonding portion 64. Therefore, it is possible to increase the bonding strength between the cover portion 61 having a tubular shape and the door column 203, the side structure 162.

Ninth Embodiment

Figure 19:
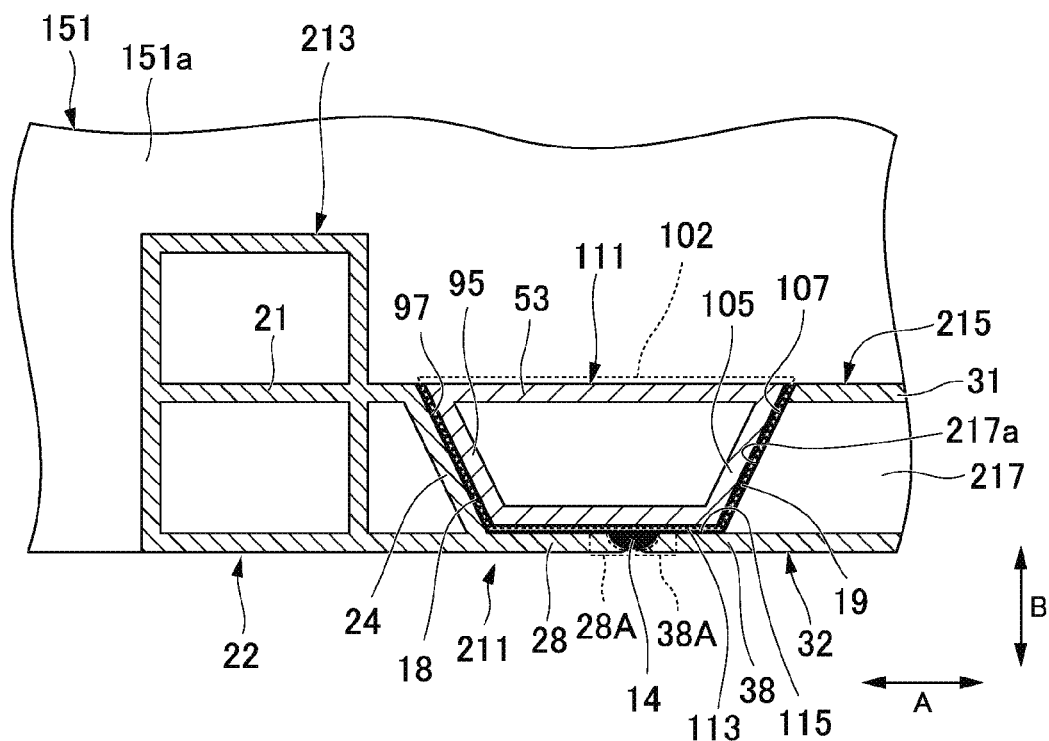
FIG. 19 is a plan view showing a schematic configuration of main parts of a vehicle to which a double-skin structure of a ninth embodiment of the present invention is applied, and is a cross-sectional view showing an upper portion of each of a door column, a side structure, and a cover portion.

A double-skin structure 211 of a ninth embodiment will be described with reference to FIG. 19. In FIG. 19, the same reference symbols will be assigned to the same configuration elements as those of the structures shown in FIGS. 10 and 15.

The double-skin structure 211 forms part of a vehicle 210. The double-skin structure 211 has the same configuration as that of the double-skin structure 110 of the second modification example of the third embodiment except that the double-skin structure 211 has a door column 213 and a side structure 215 instead of the first mold member 91 and the second mold member 101 of the double-skin structure 110.

The recessed portion 102 is formed between the door column 213 and the side structure 215 such that the width of the recessed portion 102 increases from the connection portion 14 to the first upper plate 21 and the second upper plate 31 (from an outside in the width direction B of the vehicle 210 to an inside in the width direction B).

The door column 213 has the first upper plate 21; the first lower plate 22; and the first rib 24. A longitudinal direction of each of the first upper plate 21, the first lower plate 22, and the first rib 24 is aligned with the height direction of the vehicle 210. The first rib 24 bounds part of the recessed portion 102, and is inclined with respect to the first upper plate 21 and the first lower plate 22. The first rib 24 is inclined in the same direction as an inclination direction of the first side wall plate 95.

An extruded member obtained by extruding a material in the height direction of the vehicle 210 may be used as the door column 213.

The side structure 215 has the same configuration as that of the side structure 162 except that instead of the second rib 172 of the side structure 162 shown in FIG. 15, the side structure 215 has a second rib 217 including an inclined end surface 217a which bounds part of the recessed portion 102. The second rib 217 is inclined with respect to the second upper plate 31 and the second lower plate 32. The second rib 217 is inclined in the same direction as an inclination direction of the second side wall plate 105.

An extruded member obtained by extruding a material in the longitudinal direction A of the vehicle 210 may be used as the side structure 215.

The first gap 97 is formed between the first rib 24 and the first side wall plate 95. The second gap 107 is formed between the inclined end surface 217a of the second rib 217 and the second side wall plate 105. The third gap 115 is formed between the first projection portion 28, the second projection portion 38, the connection portion 14 and the bottom plate 112.

The bonding portion 18 is disposed in such a manner that the first gap 97 is filled with the bonding portion 18. The bonding portion 19 is disposed in such a manner that the second gap 107 is filled with the bonding portion 19. The bonding portion 113 is disposed in such a manner that the third gap 115 is filled with the bonding portion 113.

In the double-skin structure 211 of the ninth embodiment, the first rib 24 and the first side wall plate 95 are inclined in the same direction such that the width of the recessed portion 102 increases from the connection portion 14 to the first upper plate 21 and the second upper plate 31, the second rib 217 and the second side wall plate 105 are inclined in the same direction, and the bonding portions 18, 19, and 113 are disposed such that the first gap 97, the second gap 107, and the third gap 115 are filled with the bonding portions 18, 19, and 113, respectively. Therefore, it is possible to reduce stress concentration in a peeling direction applied to a bonding part between the first upper plate 21 and the cover plate 53, and a bonding part between the second upper plate 31 and the cover plate 53 in the longitudinal direction A (extrusion direction of the side structure 215) of the vehicle 210.

Because a bonding surface inclined with respect to a load application direction is provided, a load can be transmitted as a shear force, and thus it is possible to increase the bonding strength.

Tenth Embodiment

Figure 20:
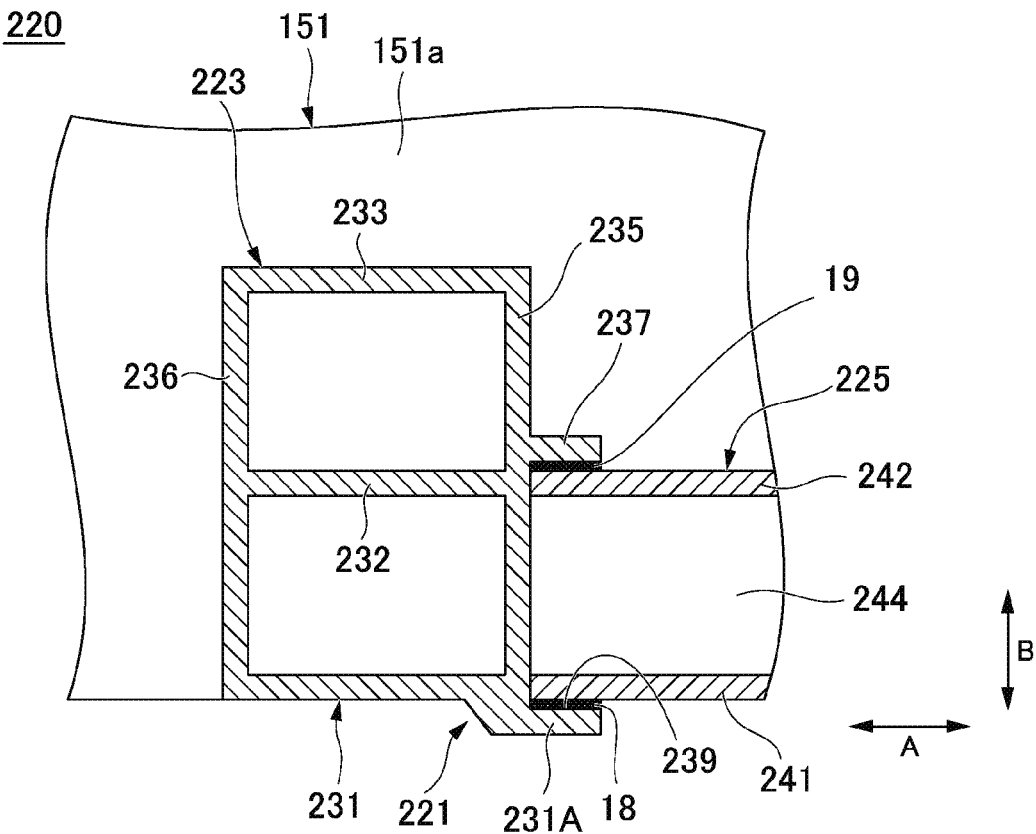
FIG. 20 is a plan view showing a schematic configuration of main parts of a vehicle to which a double-skin structure of a tenth embodiment of the present invention is applied, and is a cross-sectional view showing an upper portion of each of a door column and a side structure.

A double-skin structure 221 of a tenth embodiment will be described with reference to FIG. 20. In FIG. 20, the same reference symbols will be assigned to the same configuration elements as those of the structure shown in FIG. 15.

The double-skin structure 221 forms part of a vehicle 220. The double-skin structure 221 has a door column 223; a side structure 225; and the bonding portions 18 and 19.

The door column 223 is provided on the floor 151. The door column 223 has a first side plate 231 including a first projection portion 231A; a second side plate 232; a side plate 233; a first rib 235; a rib 236; and a second projection portion 237.

The first side plate 231 is disposed outward in the width direction B of the vehicle 220. The first side plate 231 extends upward of the floor 151. The first side plate 231 has the first projection portion 231A disposed close to the side structure 225.

The second side plate 232 is disposed inward from the first side plate 231, and extends upward of the floor 151. The second side plate 232 faces the first side plate 231 in the width direction B of the vehicle 220.

The side plate 233 is disposed inward from the second side plate 232, and extends upward of the floor 151. The side plate 233 faces the second side plate 232 in the width direction B of the vehicle 220.

The first rib 235 extends in the width direction B of the vehicle 220, and connects together one end of the first side plate 231, one end of the second side plate 232, and one end of the side plate 233. The first projection portion 231A of the first side plate 231 projects from the first rib 235 to the side structure 225 in the longitudinal direction of the vehicle 220.

The rib 236 extends in the width direction B of the vehicle 220, and connects together the other end of the first side plate 231, the other end of the second side plate 232, and the other end of the side plate 233.

The rib 236 faces the first rib 235 in the longitudinal direction A of the vehicle 220.

The second projection portion 237 projects from a portion (positioned opposite to one side of the first rib 235, to which the second side plate 232 is connected) of the first rib 235 to the side structure 225 (to one side in the longitudinal direction A of the vehicle 220).

An insertion groove 239 is formed between the second projection portion 237 and the first projection portion 231A such that an end portion of the side structure 225 is inserted into the insertion groove 239.

An extruded member obtained by extruding a material in the height direction of the vehicle 220 may be used as the door column 223 having this configuration. Because an extruded member obtained by extruding a material in the height direction of the vehicle 220 is used as the door column 223, it is possible to easily form the first projection portion 231A and the second projection portion 237.

The side structure 225 has a third side plate 241; a fourth side plate 242; and a second rib 244.

The third side plate 241 extends to the insertion groove 239, and faces the first projection portion 231A while a gap is interposed between the third side plate 241 and the first projection portion 231A in the width direction B of the vehicle 220.

The fourth side plate 242 extends to the insertion groove 239, and faces the second projection portion 237 while a gap is interposed between the fourth side plate 242 and the second projection portion 237 in the width direction B of the vehicle 220.

The second rib 244 is provided between the third side plate 241 and the fourth side plate 242, and connects together the third side plate 241 and the fourth side plate 242.

An extruded member obtained by extruding a material in the longitudinal direction A of the vehicle 220 can be used as the side structure 225 having this configuration.

The bonding portion 18 is disposed in such a manner that a gap formed between the first projection portion 231A and the third side plate 241 is filled with the bonding portion 18. The bonding portion 19 is disposed in such a manner that a gap formed between the second projection portion 237 and the fourth side plate 242 is filled with the bonding portion 19.

That is, in the double-skin structure 221, the door column 223 and the side structure 225 are connected together only via bonding without using the friction stir joining method or a welding method.

In the double-skin structure 221 of the tenth embodiment, the insertion groove 239 (into which the end portion of the side structure 225 is inserted) is formed between the first projection portion 231A and the second projection portion 237, the end portion of the side structure 225 is disposed in the insertion groove 239, the bonding portion 18 is provided between the third side plate 241 and the first projection portion 231A, and the bonding portion 19 is provided between the fourth side plate 242 and the second projection portion 237. Therefore, it is possible to bond together the door column 223 and the side structure 225 without using a technique such as the friction stir joining method or a welding method.

Therefore, it is possible to improve the aesthetic of the double-skin structure 221 in addition to restricting an increase in the number of manufacturing steps.

In the double-skin structure 221, the third side plate 241 and the first projection portion 231A may be mechanically connected together via the first connection member 181 (shown in FIG. 16) penetrating therethrough from the first projection portion 231A, and the fourth side plate 242 and the second projection portion 237 may be connected together via the second connection member 182 (shown in FIG. 16) penetrating therethrough from the second projection portion 237. Therefore, it is possible to improve a connection strength between the door column 223 and the side structure 225.

Figure 21:
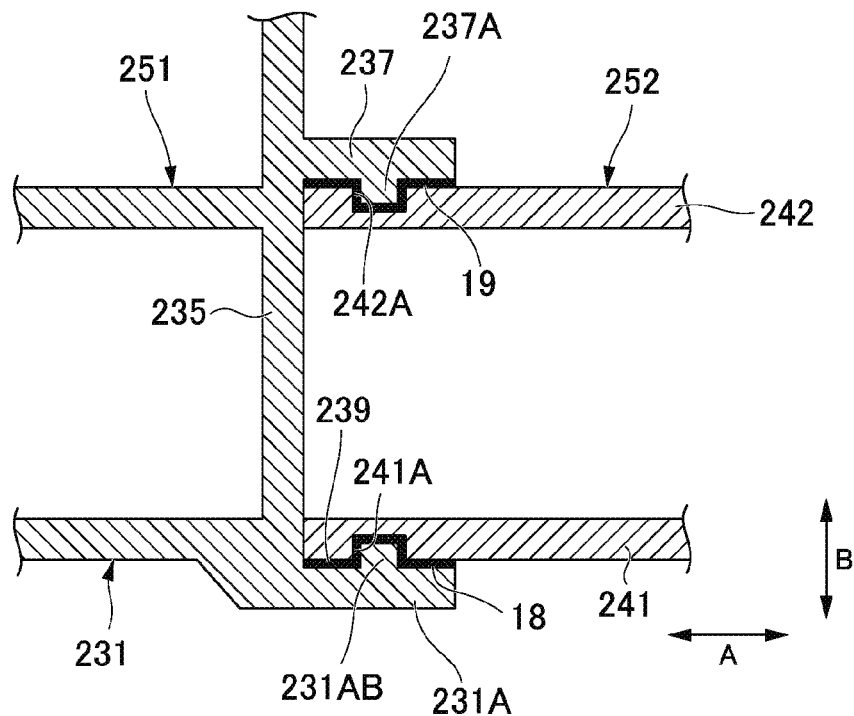
FIG. 21 is a plan view showing cross sections of main parts of a double-skin structure according to a modification example of the tenth embodiment of the present invention.

Subsequently, a double-skin structure 250 of a modification example of the tenth embodiment will be described with reference to FIG. 21. In FIG. 21, the same reference symbols will be assigned to the same configuration elements as those of the structure shown in FIG. 20.

The double-skin structure 250 has the same configuration as that of the double-skin structure 221 except that the first projection portion 231A has a first protrusion portion 231AB, the second projection portion 237 has a second protrusion portion 237A, a first recessed portion 241A is formed in the third side plate 241, and a second recessed portion 242A is formed in the fourth side plate 242.

The first protrusion portion 231AB projects to the second projection portion 237. The first recessed portion 241A accommodates part of the first protrusion portion 231AB via the bonding portion 18. A projection amount of the first protrusion portion 231AB is set to be greater than the depth of the first recessed portion 241A. Because the projection amount of the first protrusion portion 231AB is set to be greater than the depth of the first recessed portion 241A, it is possible to ensure a region in which the bonding portion 18 is disposed.

The second protrusion portion 237A projects to the first projection portion 231A. The second recessed portion 242A accommodates part of the second protrusion portion 237A via the bonding portion 19. A projection amount of the second protrusion portion 237A is set to be greater than the depth of the second recessed portion 242A.

Because the projection amount of the second protrusion portion 237A is set to be greater than the depth of the second recessed portion 242A, it is possible to ensure a region in which the bonding portion 19 is disposed.

Because the double-skin structure 250 of the modification example of the tenth embodiment has the first projection portion 231A with the first protrusion portion 231AB projecting to the second projection portion 237; the second projection portion 237 with the second protrusion portion 237A projecting to the first projection portion 231A; the third side plate 241 with the first recessed portion 241A that accommodates part of the first protrusion portion 231AB while the bonding portion 18 is interposed between the first recessed portion 241A and part of the first protrusion portion 231AB; and the fourth side plate 242 with the second recessed portion 242A that accommodates part of the second protrusion portion 237A while the bonding portion 19 is interposed between the second recessed portion 242A and part of the second protrusion portion 237A, a side structure 252 can be slidably fitted into the insertion groove 239, and it is possible to improve the bonding strength between a door column 251 and the side structure 252.

Eleventh Embodiment

Figure 22:
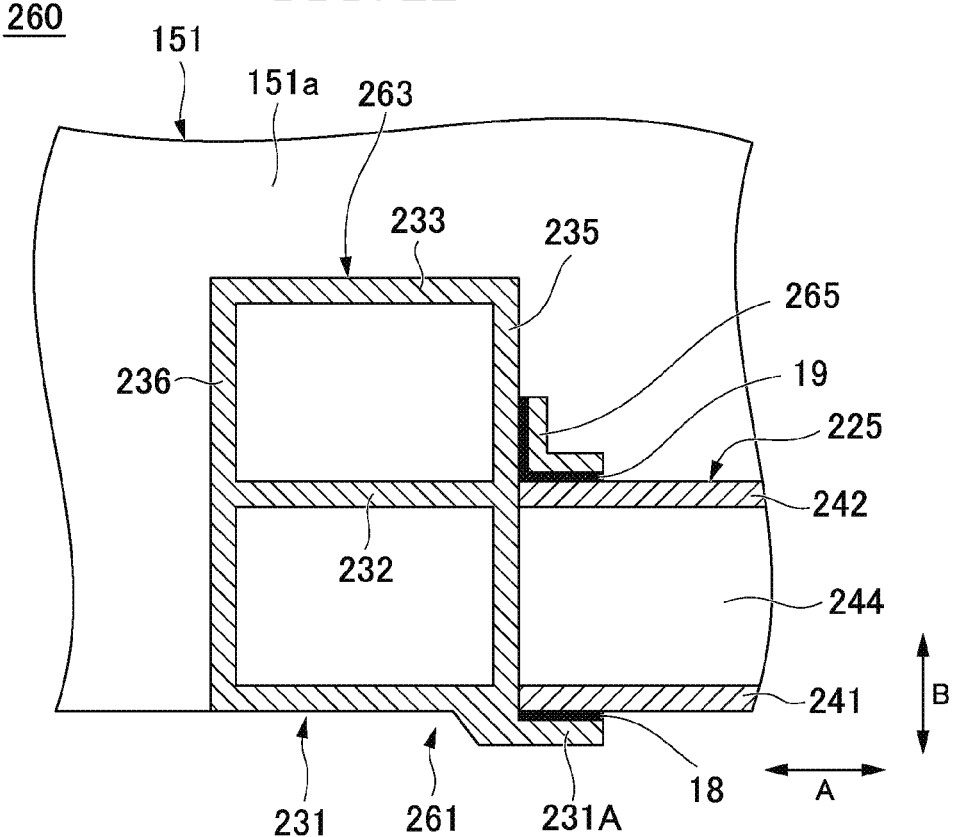
FIG. 22 is a plan view showing a schematic configuration of main parts of a vehicle to which a double-skin structure of an eleventh embodiment of the present invention is applied, and is a cross-sectional view showing an upper portion of each of a door column, a side structure, and a bonding member.

A double-skin structure 261 of an eleventh embodiment will be described with reference to FIG. 22. In FIG. 22, the same reference symbols will be assigned to the same configuration elements as those of the structure shown in FIG. 20.

The double-skin structure 261 forms part of a vehicle 260. The double-skin structure 261 has the same configuration as that of the double-skin structure 221 of the tenth embodiment except that the double-skin structure 261 has a door column 263 and a bonding member 265 instead of the door column 223 of the double-skin structure 221.

The door column 263 has the same configuration as that of the door column 223 except that the second projection portion 237 is removed from the configuration elements of the door column 223, and the insertion groove 239 is not formed.

The bonding member 265 is a member having an L shape. The bonding member 265 is disposed to face a corner portion formed by the fourth side plate 242 and the first rib 235.

The bonding portion 19 is provided between the bonding member 265 and the corner portion of the fourth side plate 242 and the first rib 235.

In the double-skin structure 261 of the eleventh embodiment, because the bonding member 265 having an L shape is provided to face the corner portion formed by the fourth side plate 242 and the first rib 235, and the bonding portion 19 is disposed between the bonding member 265 and the fourth side plate 242, the first rib 235, it is possible to easily bond together the door column 263 and the side structure 225 compared to when bonding is performed after inserting the end portion of the side structure into the insertion groove formed in the door column (in the structures shown in FIGS. 20 and 21).

Twelfth Embodiment

Figure 23:
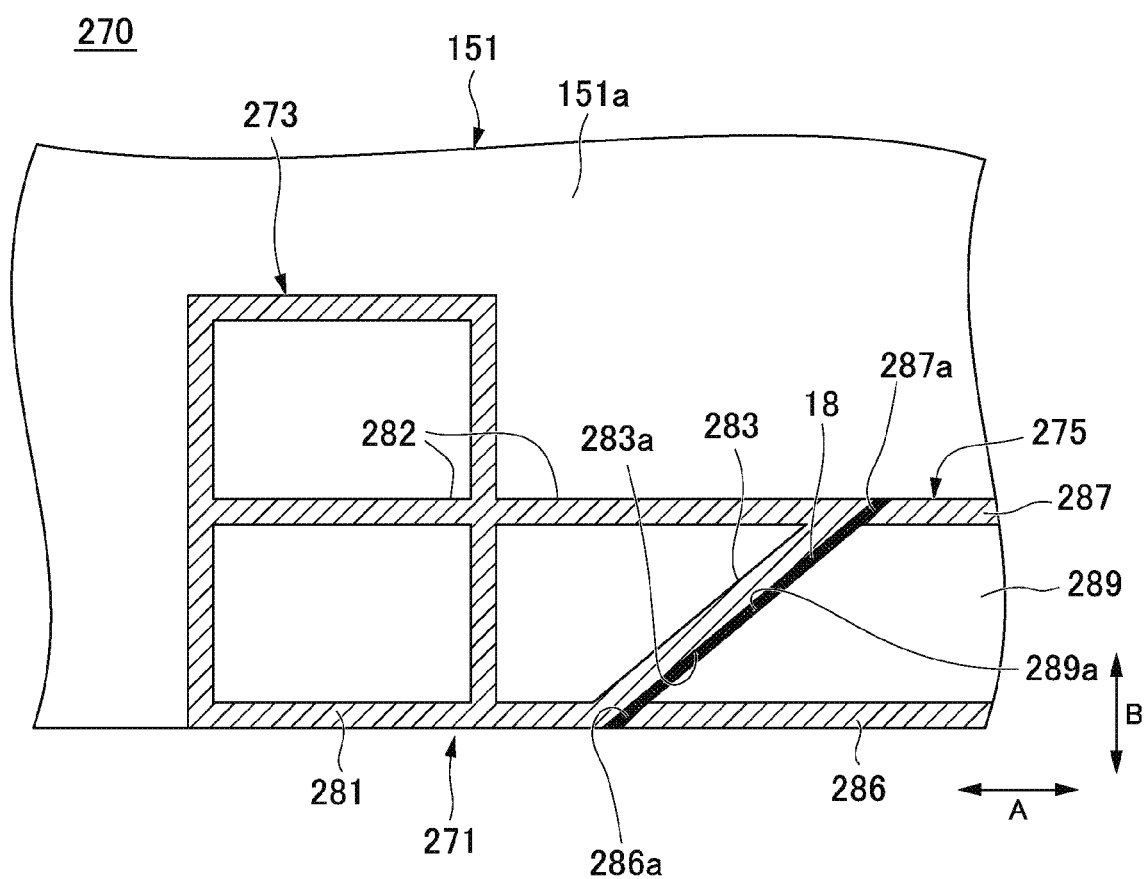
FIG. 23 is a plan view showing a schematic configuration of main parts of a vehicle to which a double-skin structure of a twelfth embodiment of the present invention is applied, and is a cross-sectional view showing an upper portion of each of a door column and a side structure.

A double-skin structure 271 of a twelfth embodiment will be described with reference to FIG. 23. In FIG. 23, the same reference symbols will be assigned to the same configuration elements as those of the structure shown in FIG. 20.

The double-skin structure 271 is applied to a vehicle 270, and is provided on the floor 151.

The double-skin structure 271 has a door column 273; a side structure 275; and the bonding portion 18.

The door column 273 has a first side plate 281; a second side plate 282 that faces the first side plate 281 in the width direction B of the vehicle 270; and a first rib 283.

The first side plate 281 is disposed outward in the width direction B of the vehicle 270. The second side plate 282 is disposed inward from the first side plate 281, and faces the first side plate 281 in the width direction B of the vehicle 270. A portion (positioned close to the side structure 275) of the second side plate 282 further extends to the side structure 275 than the first side plate 281.

The first rib 283 connects together an end (positioned close to the side structure 275) of the first side plate 281 and an end (positioned close to the side structure 275) of the second side plate 282. Therefore, the first rib 283 is inclined with respect to the first side plate 281 and the second side plate 282. The first rib 283 faces the side structure 275, and has an inclined end surface 283a.

An extruded member obtained by extruding a material in the height direction of the vehicle 270 can be used as the door column 273.

The side structure 275 faces the door column 273 in the width direction B of the vehicle 270. The side structure 275 has a third side plate 286; a fourth side plate 287; and a second rib 289.

The third side plate 286 extends to the first side plate 281. The third side plate 286 has an inclined end surface 286*a* that faces the inclined end surface 283*a* of the first rib 283 while a gap is interposed between the inclined end surface 286*a* and the inclined end surface 283*a*.

The fourth side plate 287 extends to the second side plate 282. The fourth side plate 287 has an inclined end surface 287*a* that faces the inclined end surface 283*a* of the first rib 283 while a gap is interposed between the inclined end surface 287*a* and the inclined end surface 283*a*.

The second rib 289 connects together the third side plate 286 and the fourth side plate 287. The second rib 289 is inclined in the same direction as an inclination direction of the first rib 283, and has an inclined end surface 289*a* facing the inclined end surface 283*a* of the first rib 283.

An extruded member obtained by extruding a material in the longitudinal direction A of the vehicle 270 can be used as the side structure 275.

The bonding portion 18 is provided between the inclined end surface 283*a* of the first rib 283 and the inclined end surface 286*a* of the third side plate 286, the inclined end surface 287*a* of the fourth side plate 287, the inclined end surface 289*a* of the second rib 289.

In the double-skin structure 271 of the twelfth embodiment, because the bonding portion 18 is provided between the inclined end surface 283*a* of the first rib 283 and the inclined end surface 286*a* of the third side plate 286, the inclined end surface 287*a* of the fourth side plate 287, the inclined end surface 289*a* of the second rib 289, it is possible to bond together the door column 273 and the side structure 275 without using a technique such as the friction stir joining method or a welding method.

Therefore, it is possible to improve the aesthetic of the double-skin structure 271 in addition to restricting an increase in the number of manufacturing steps.

Because the bonding portion 18 is inclinedly disposed, it is possible to reduce stress concentration in a peeling direction applied to a bonding part between the door column 273 and the side structure 275 in the longitudinal direction A (extrusion direction of the side structure 275) of the vehicle 270.

Because a bonding surface inclined with respect to a load application direction is provided, a load can be transmitted as a shear force, and thus it is possible to increase the bonding strength.

Preferred embodiments of the present invention have been described in detail above, and the present invention is not limited to specific embodiments. Various modifications and changes can be made without departing from the concept of the present invention described in the claims.

BRIEF DESCRIPTION OF THE REFERENCE SYMBOLS

10, 45, 60, 70, 90, 100, 110, 120, 130, 140, 160, 176, 191, 201, 211, 221, 250, 261, 271: double-skin structure
11, 46, 71, 91, 141: first mold member
12, 47, 72, 101, 121, 142: second mold member
14: connection portion
14A, 21A, 22A, 26A, 28A, 31A, 32A, 36A, 38A, 151A: upper surface
15, 51, 92, 102, 122: recessed portion
15A: bottom surface
17, 53: cover plate
17A, 21B, 31B, 62A: lower surface
17A: first end portion
17B: second end portion
18, 19, 64, 75, 78, 113: bonding portion
21: first upper plate
21A: first upper plate end portion
22: first lower plate
24, 167, 235, 283: first rib
24*a*, 34*a*, 95*a*, 105*a*, 112*a*: external surface
24A, 34A: lower end
24B, 34B: upper end
24C, 34C, 95A, 105A: upper end portion
26: first extension portion
28, 231A: first projection portion
28A, 38A: end portion
31: second upper plate
31A: second upper plate end portion
32: second lower plate
34, 172, 217, 244, 289: second rib
36: second extension portion
38, 237: second projection portion
49, 61, 93, 103, 111, 123, 131, 177: cover portion
54, 95: first side wall plate
55, 105: second side wall plate
56, 97: first gap
57, 107: second gap
62, 112: bottom plate
63, 73, 115: third gap
77: fourth gap
81: first groove boundary plate
82: second groove boundary plate
83: first groove
84: second groove
150, 175, 190, 200, 210, 220, 260, 270: vehicle
151: floor
161, 192, 203, 213, 223, 251, 263, 273: door column
162, 215, 225, 275: side structure
165: plate
168, 236: rib
169: third rib
172A, 283A: end surface
181: first connection member
182: second connection member
185: cover portion body
186: connection part
194: end portion accommodating portion
217A, 286A, 287A, 289A: inclined end surface
231, 281: first side plate
231AB: first protrusion portion
232, 282: second side plate
233: side plate
237A: second protrusion portion
239: insertion groove
241, 286: third side plate
241A: first recessed portion
242, 287: fourth side plate
242A: second recessed portion
265: bonding member
A: longitudinal direction
B: width direction
C: height direction
$\theta_1, \theta_2$: angle

What is claimed is:

1. A double-skin structure comprising:
a first mold member which includes
a first upper plate including a first upper plate end portion,
a first lower plate, part of which is disposed to face a lower surface of the first upper plate, and
a first rib connecting together the first upper plate and the first lower plate, and
in which the first lower plate includes a first projection portion projecting from a lower end of the first rib in an extension direction of the first lower plate;
a second mold member which includes
a second upper plate that includes a second upper plate end portion facing the first upper plate end portion in an extension direction of the first upper plate, and that extends in the extension direction of the first upper plate,
a second lower plate, part of which is disposed to face a lower surface of the second upper plate, and which extends in the extension direction of the first lower plate, and
a second rib connecting together the second upper plate and the second lower plate, and
in which the second lower plate includes a second projection portion projecting from a lower end of the second rib in the extension direction of the first lower plate;
a connection portion connecting together an end portion of the first projection portion and an end portion of the second projection portion;
a cover portion that is provided in a recessed portion bounded by the first rib, the second rib, the first projection portion, and the second projection portion, and that blocks an upper end side of the recessed portion; and
a bonding portion that bonds the cover portion to the first mold member, and the cover portion to the second mold member,
wherein the cover portion includes
a cover plate extending from the first upper plate to the second upper plate,
a first side wall plate that is provided in a portion of the cover plate, which is positioned close to the first rib, and that extends from the cover plate to the first lower plate while a first gap is interposed between the first side wall plate and the first rib, and
a second side wall plate that is provided in a portion of the cover plate, which is positioned close to the second rib, and that extends from the cover plate to the second lower plate while a second gap is interposed between the second side wall plate and the second rib,
wherein the bonding portion is provided in each of the first gap and the second gap, and bonds the first rib to the first side wall plate and the second rib to the first side wall plate,
wherein the cover portion includes a bottom plate that is disposed downward of the cover plate so as to face the cover plate, and that connects together a lower end of the first side wall plate and a lower end of the second side wall plate,
wherein a lower surface of the bottom plate is disposed to face an upper surface of the first projection portion, an upper surface of the second projection portion, and an upper surface of the connection portion, and
wherein the bonding portion is provided between the bottom plate and the first projection portion, the second projection portion, the connection portion.

2. The double-skin structure according to claim 1,
wherein the connection portion is a friction stir joining portion.

3. The double-skin structure according to claim 1,
wherein the first mold member includes a first extension portion extending from the first rib to the second rib, and disposed in the recessed portion,
wherein the second mold member includes a second extension portion that is disposed in the recessed portion while extending from the second rib to the first rib, and that faces the first extension portion in the extension direction of the first upper plate,
wherein the cover portion is a cover plate disposed on an upper surface of the first extension portion and an upper surface of the second extension portion, and
wherein the bonding portion is provided between the cover plate and the first extension, and between the cover plate and the second extension portion.

4. The double-skin structure according to claim 1,
wherein the first mold member includes a first groove boundary plate that is positioned closer to the end portion of the first projection portion than the first rib, that is provided to extend upward of the first projection portion from the upper surface of the first projection portion, and that bounds a first groove which is interposed between the first rib and the first groove boundary plate and into which the first side wall plate is capable of being inserted,
wherein the second mold member includes a second groove boundary plate that is positioned closer to the end portion of the second projection portion than the second rib, that is provided to extend upward of the second projection portion from the upper surface of the second projection portion, and that bounds a second groove which is interposed between the second rib and the second groove boundary plate and into which the second side wall plate is capable of being inserted, and
wherein the bonding portion is provided between the first groove boundary plate and the first side wall plate, and between the second groove boundary plate and the first side wall plate.

5. The double-skin structure according to claim 1
wherein at least one pair of the first rib and the first side wall plate, and the second rib and the second side wall plate are disposed inclinedly with respect to the respective corresponding lower plates in the same direction.

6. The double-skin structure according to claim 1,
wherein the first rib and the second rib are provided inclinedly with respect to the first lower plate and the second lower plate, respectively, such that a width of the recessed portion increases from a bottom surface of the recessed portion to a top of the recessed portion,
wherein the cover portion includes
a first side wall plate that is inclined with respect to the first lower plate while a first gap is formed between the first side wall plate and the first rib,
a second side wall plate is inclined with respect to the second lower plate while a second gap is formed between the second side wall plate and the second rib, and
a cover plate provided between the first side wall plate and the second side wall plate, and connecting together the first side wall plate and the second side wall plate, and wherein a position where the first side wall plate is connected to the cover plate is lower than a position of an upper end portion of the first side wall plate, and a position where the second side wall plate is connected to the cover plate is lower than a position of an upper end portion of the second side wall plate.

7. The double-skin structure according to claim 1,
wherein the first upper plate and the first rib are connected together at a position lower than a position of an upper end portion of the first rib, and
wherein the second upper plate and the second rib are connected together at a position lower than a position of an upper end portion of the second rib.

8. The double-skin structure according to claim 1,
wherein the first mold member, the second mold member, the cover portion, and the bonding portion form a floor of a vehicle, and
the structure further comprising:
    a door column including the first upper plate, the first lower plate, and the first rib;
    a side structure including the second upper plate, the second lower plate, and the second rib; and
    the cover portion,
wherein the door column and the side structure form part of the vehicle, and are erectly disposed on the floor of the vehicle,
wherein the extension direction of the first upper plate and the extension direction of the first lower plate are a longitudinal direction of the vehicle, and a direction of disposition of the first upper plate and the first lower plate is a width direction of the vehicle, and
wherein the first upper plate is disposed further inward in the width direction of the vehicle from a position where the first lower plate is disposed.

9. The double-skin structure according to claim 8,
wherein the door column is an extruded member obtained by extruding a material in a height direction of the vehicle, and
wherein the side structure is an extruded member obtained by extruding a material in the longitudinal direction of the vehicle.

10. The double-skin structure according to claim 8,
wherein the door column has a third rib extending from the first rib further inward from the first upper plate in the width direction of the vehicle,
wherein the cover portion has a cover portion body blocking the recessed portion, and a connection part that extends inward in the width direction of the vehicle from an end portion of the cover portion body, which is positioned close to the third rib, and that faces the third rib, and
wherein the bonding portion is provided between the first rib and the connection part.

11. The double-skin structure according to claim 10, further comprising,
a first connection member that mechanically connects together the cover portion body and the second upper plate while penetrating therethrough from the cover portion body; and
a second connection member that mechanically connects together the third rib and the connection part while penetrating therethrough from the connection part.

12. The double-skin structure according to claim 8,
wherein the door column has a third rib extending inward from the first upper plate in the width direction of the vehicle,
wherein the third rib forms an end portion accommodating portion which is interposed between the third rib and the first upper plate, and into which an end portion of the cover portion is inserted, and
wherein, in a state where the end portion of the cover portion is inserted into the end portion accommodating portion, the bonding portion is provided between the first upper plate and a surface of the end portion of the cover portion which is positioned outward in the width direction of the vehicle, and between the third rib and a surface of the end portion of the cover portion which is positioned inward in the width direction of the vehicle.

13. The double-skin structure according to claim 8, further comprising:
a door column including the first upper plate, the first lower plate, and the first rib;
a side structure including the second upper plate, the second lower plate, and the second rib; and
the cover portion,
wherein the door column and the side structure form part of the vehicle, and are erectly disposed on the floor of the vehicle,
wherein the extension direction of the first upper plate and the extension direction of the first lower plate are the longitudinal direction of the vehicle,
wherein the direction of disposition of the first upper plate and the first lower plate is the width direction of the vehicle,
wherein the cover portion includes
    a cover plate extending from the first upper plate to the second upper plate,
    a first side wall plate that is provided in an end portion of the cover plate, which is positioned close to the first rib, and that extends from the cover plate to the first lower plate while a first gap is interposed between the first side wall plate and the first rib,
    a second side wall plate that is provided in an end portion of the cover plate, which is positioned close to the second rib, and that extends from the cover plate to the second lower plate while a second gap is interposed between the second side wall plate and the second rib, and
    a bottom plate that is disposed close to the first projection portion and the second projection portion of the cover plate so as to face the cover plate, and that connects together an end of the first side wall plate and an end of the second side wall plate,
wherein the bottom plate is disposed to face the first projection portion, the second projection portion, and the connection portion while a third gap is interposed between the bottom plate and the first projection portion, the second projection portion, the connection portion, and
wherein the bonding portion is disposed in such a manner that each of the first gap, the second gap, and the third gap is filled with the bonding portion.

14. The double-skin structure according to claim 13,
wherein the first rib and the second rib are provided inclinedly with respect to the first lower plate and the second lower plate, respectively, such that a width of the recessed portion increases from the connection portion to the first upper plate and the second upper plate, wherein the first side wall plate is inclined in the same direction as an inclination direction of the first rib while the first gap is formed between the first side wall plate and the first rib, and wherein the second side wall plate is inclined in the same direction as an inclination direction of the second rib while the second gap is formed between the second side wall plate and the second rib.

15. A double-skin structure that forms part of a vehicle, and includes a door column and a side structure which are erectly disposed on a floor of the vehicle, the structure comprising:

a bonding portion bonding together the door column and the side structure which are disposed to face each other in a longitudinal direction of the vehicle, wherein the door column includes
a first side plate,
a second side plate disposed inward from the first side plate, and facing the first side plate in a width direction of the vehicle,
a first rib which extends in the width direction of the vehicle and connects together the first side plate and the second side plate, and from which a first projection portion of the first side plate projects to the side structure, and
a second projection portion that projects to the side structure from a portion of the first rib, which is positioned opposite to one side of the first rib to which the second side plate is connected, and that forms an insertion groove which is interposed between the second projection portion and the first projection portion and into which an end portion of the side structure is inserted, wherein the side structure includes
a third side plate extending to the insertion groove, and facing the first projection portion in the width direction of the vehicle,
a fourth side plate extending to the insertion groove, and facing the second projection portion in the width direction of the vehicle, and
a second rib connecting together the third side plate and the fourth side plate, and wherein the bonding portion is provided between the first projection portion and the third side plate, and between the fourth side plate and the second projection portion.

16. The double-skin structure according to claim 15, further comprising:

a first connection member that mechanically connects together the third side plate and the first projection portion while penetrating therethrough from the first projection portion; and
a second connection member that mechanically connects together the fourth side plate and the second projection portion while penetrating therethrough from the second projection portion.

17. The double-skin structure according to claim 16, wherein the first projection portion includes a first protrusion portion projecting to the second projection portion, wherein the second projection portion includes a second protrusion portion projecting to the first projection portion, wherein the third side plate is provided with a first recessed portion that accommodates part of the first protrusion portion while the bonding portion is interposed between part of the first protrusion portion and the first recessed portion, and wherein the fourth side plate is provided with a second recessed portion that accommodates part of the second protrusion portion while the bonding portion is interposed between part of the second protrusion portion and the second recessed portion.

18. The double-skin structure according to claim 15, wherein the door column is an extruded member obtained by extruding a material in a height direction of the vehicle, and wherein the side structure is an extruded member obtained by extruding a material in the longitudinal direction of the vehicle.

19. A double-skin structure that forms part of a vehicle, and includes a door column and a side structure which are erectly disposed on a floor of the vehicle, the structure comprising:

a bonding portion bonding together the door column and the side structure which are disposed to face each other in a longitudinal direction of the vehicle; and
a bonding member having an L shape, wherein the door column includes
a first side plate,
a second side plate disposed inward from the first side plate, and facing the first side plate in a width direction of the vehicle, and
a first rib which extends in the width direction of the vehicle and connects together the first side plate and the second side plate, and from which a first projection portion of the first side plate projects to the side structure, wherein the side structure includes
a third side plate facing the first projection portion in the width direction of the vehicle,
a fourth side plate that is disposed inward from the third side plate, faces the third side plate in the width direction of the vehicle, and is in contact with the first rib in the longitudinal direction of the vehicle, and
a second rib connecting together the third side plate and the fourth side plate, wherein the bonding member is disposed to face a corner portion formed by the fourth side plate and the first rib, and wherein the bonding portion is provided between the bonding member and the fourth side plate, the first rib, and between the third side plate and the first projection portion.

* * * * *